US008825434B2

United States Patent
Koshimizu et al.

(10) Patent No.: US 8,825,434 B2
(45) Date of Patent: Sep. 2, 2014

(54) TEMPERATURE MEASURING METHOD, STORAGE MEDIUM, AND PROGRAM

(75) Inventors: Chishio Koshimizu, Nirasaki (JP); Jun Yamawaku, Nirasaki (JP); Tatsuo Matsudo, Nirasaki (JP)

(73) Assignee: Tokyo Electron Limited (JP)

( * ) Notice: Subject to any disclaimer, the term of this patent is extended or adjusted under 35 U.S.C. 154(b) by 463 days.

(21) Appl. No.: 13/248,538

(22) Filed: Sep. 29, 2011

(65) Prior Publication Data

US 2012/0084045 A1    Apr. 5, 2012

Related U.S. Application Data

(60) Provisional application No. 61/393,226, filed on Oct. 14, 2010.

(30) Foreign Application Priority Data

Sep. 30, 2010 (JP) ................................. 2010-222821

(51) Int. Cl.
| | |
|---|---|
| G01K 11/00 | (2006.01) |
| G01K 11/12 | (2006.01) |
| G01B 11/06 | (2006.01) |
| G01B 9/02 | (2006.01) |

(52) U.S. Cl.
CPC .......... *G01K 11/125* (2013.01); *G01B 11/0675* (2013.01); *G01B 9/02025* (2013.01); *G01B 9/02021* (2013.01); *G01B 9/0209* (2013.01)
USPC .............. 702/134; 702/99; 374/129; 356/432; 356/478; 356/497; 356/503

(58) Field of Classification Search
CPC ............. G01B 11/0675; G01B 9/0209; G01B 9/02025; G01B 11/06; G01B 9/02031
USPC ............ 702/99, 134; 374/129; 356/432, 478, 356/497, 503
See application file for complete search history.

(56) References Cited

U.S. PATENT DOCUMENTS

| | | | | |
|---|---|---|---|---|
| 6,008,906 A | * | 12/1999 | Maris ............................ | 356/432 |
| 6,116,779 A | * | 9/2000 | Johnson et al. ................ | 374/161 |
| 6,211,961 B1 | * | 4/2001 | Maris ............................ | 356/432 |

(Continued)

FOREIGN PATENT DOCUMENTS

| | | |
|---|---|---|
| JP | 11132726 | 5/1999 |
| JP | 2005084019 | 3/2005 |
| JP | 2006-112826 | 4/2006 |
| JP | 2007184564 | 7/2007 |

*Primary Examiner* — Carol S Tsai
(74) *Attorney, Agent, or Firm* — Cantor Colburn LLP

(57) ABSTRACT

A temperature measuring method includes: transmitting a light to a measurement point of an object to be measured, the object being a substrate on which a thin film is formed; measuring a first interference wave caused by a reflected light from a surface of the substrate, and a second interference wave caused by reflected lights from an interface between the substrate and the thin film and from a rear surface of the thin film; calculating an optical path length from the first interference wave to the second interference wave; calculating a film thickness of the thin film; calculating an optical path difference between an optical path length of the substrate and the calculated optical path length; compensating for the optical path length from the first interference wave to the second interference wave; and calculating a temperature of the object at the measurement point.

7 Claims, 19 Drawing Sheets

(56) References Cited

U.S. PATENT DOCUMENTS

| | | | |
|---|---|---|---|
| 7,206,076 B2* | 4/2007 | Blalock | 356/503 |
| 7,355,715 B2* | 4/2008 | Suzuki et al. | 356/478 |
| 7,379,189 B2* | 5/2008 | Suzuki et al. | 356/503 |
| 7,446,881 B2* | 11/2008 | Suzuki et al. | 356/497 |
| 7,543,981 B2* | 6/2009 | Timans | 374/129 |
| 7,734,439 B2* | 6/2010 | Timans | 702/99 |
| 7,952,717 B2* | 5/2011 | Abe et al. | 356/478 |
| 7,957,926 B2* | 6/2011 | Timans | 702/99 |
| 8,157,439 B2* | 4/2012 | Timans | 374/129 |
| 8,170,389 B1* | 5/2012 | Komura et al. | 385/129 |
| 8,182,142 B2* | 5/2012 | Abe et al. | 374/129 |
| 2006/0077394 A1* | 4/2006 | Suzuki et al. | 356/479 |
| 2006/0152734 A1* | 7/2006 | Suzuki et al. | 356/479 |
| 2006/0176490 A1* | 8/2006 | Suzuki et al. | 356/479 |
| 2008/0002753 A1* | 1/2008 | Timans | 374/2 |
| 2009/0245320 A1* | 10/2009 | Timans | 374/2 |
| 2012/0201271 A1* | 8/2012 | Timans | 374/161 |

* cited by examiner

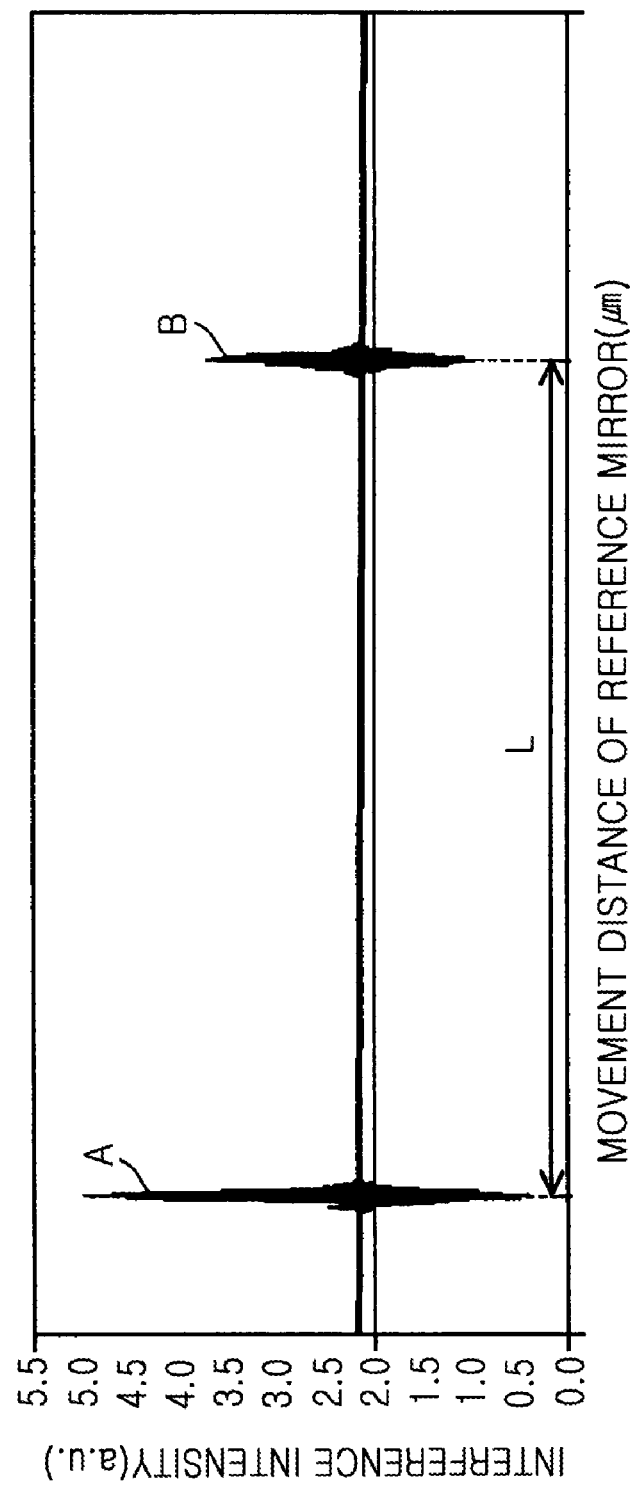

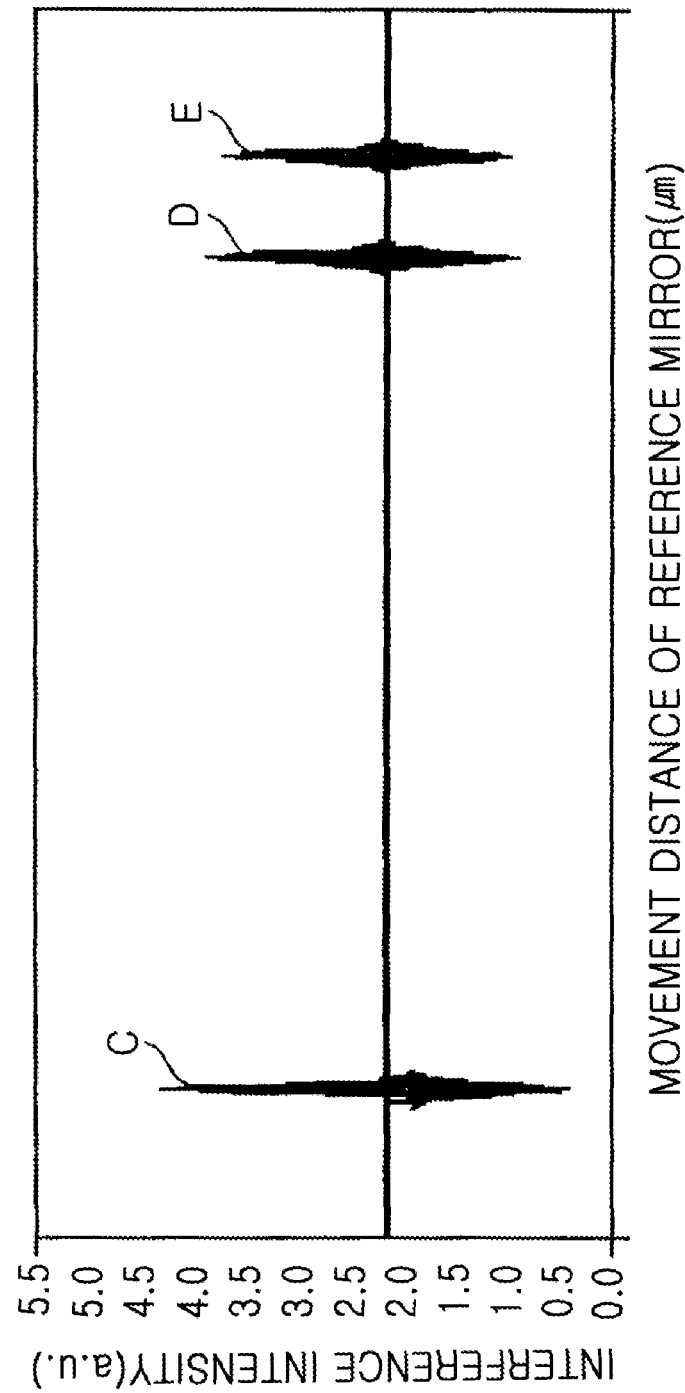

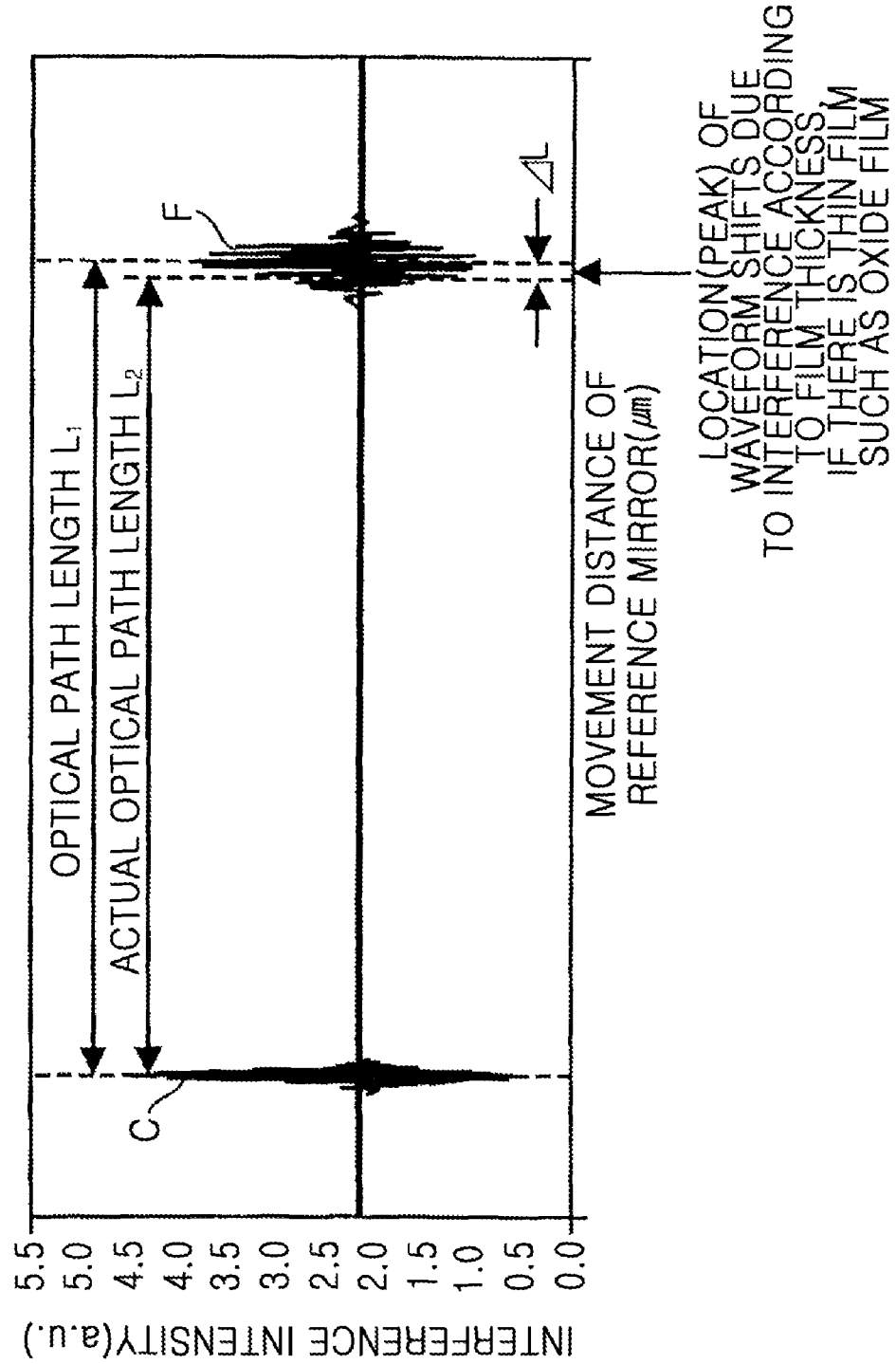

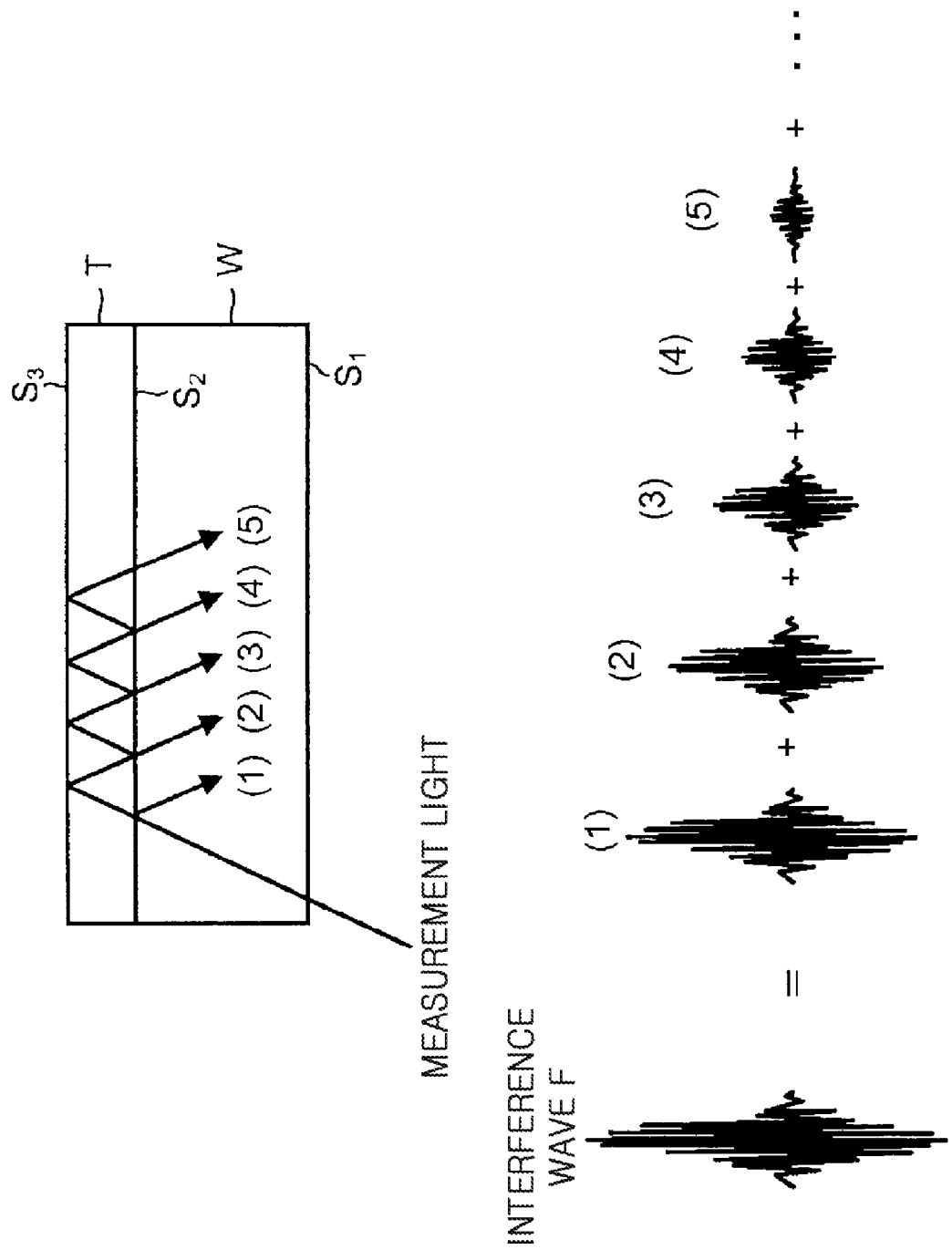

US 8,825,434 B2

TEMPERATURE MEASURING METHOD, STORAGE MEDIUM, AND PROGRAM

CROSS-REFERENCE TO RELATED PATENT APPLICATIONS

This application claims the benefit of Japanese Patent Application No. 2010-222821, filed on Sep. 30, 2010, in the Japan Patent Office and U.S. Patent Application Ser. No. 61/393,226, filed Oct. 14, 2010, in the United States Patent and Trademark Office, the disclosure of which is incorporated herein in its entirety by reference.

BACKGROUND OF THE INVENTION

1. Field of the Invention

The present invention relates to a temperature measuring method, a storage medium, and a program, which can measure a temperature of an object to be measured (for example, a semiconductor wafer or a liquid crystal substrate) in a non-contact manner.

2. Description of the Related Art

Accurately measuring a temperature of a substrate (for example, a semiconductor wafer) to be processed by using a substrate processing apparatus is very important in order to accurately control shapes, properties, and so on of films or holes formed on or in the semiconductor wafer by various processes such as film formation and etching. Accordingly, a temperature of a semiconductor wafer has been measured by using various conventional methods such as a temperature measuring method using a resistance thermometer, a fluorescent thermometer for measuring a temperature of a rear surface of a base, or the like.

Recently, a temperature measuring technology using a low-coherence interferometer which can directly measure a temperature of a semiconductor wafer, which is difficult to measure by conventional temperature measuring methods, has been developed. Also, as the temperature measuring technology using the low-coherence interferometer, a technology has been suggested in which a light from a light source is divided into a measurement light for temperature measurement and a reference light by a first splitter, the measurement light is divided into n measurement lights by a second splitter, the n measurement lights are emitted to n measurement points, and interference between reflected lights of the n measurement lights and a reflected light of the reference light reflected by a reference light reflecting unit is measured to simultaneously measure temperatures of the plurality of n measurement points (refer to, for example, Patent Reference 1). According to this technology, a light from a light source is emitted to an object to be measured, an optical path length from a surface to a rear surface of the object is obtained from an interference wave between a reflected light from the surface of the object and a reflected light of a reference light, and from an interference wave between a reflected light from the rear surface of the object and the reflected light of the reference light, and a temperature of the object is calculated from the obtained optical path length.

However, if a thin film having a thickness less than or equal to a coherence length of the light source is deposited on the object, the optical path length of the interference waves may be misaligned due to overlapping of the interference waves by multiple reflection of the measurement light in the thin film. Accordingly, the optical path length from the surface to the rear surface of the object cannot be accurately calculated, and the temperature of the object cannot be accurately monitored.

(Patent Reference 1) Japanese Laid-Open Patent Publication No. 2006-112826

SUMMARY OF THE INVENTION

The present invention provides a temperature measuring method, a program, and a storage medium, which can accurately measure a temperature of an object to be measured, even if a thin film is formed on the object.

According to an aspect of the present invention, there is provided a temperature measuring method including: transmitting a light from a light source to a measurement point of an object to be measured, the object being a substrate on which a thin film is formed; measuring a first interference wave caused by a reflected light from a surface of the substrate, and a second interference wave caused by reflected lights from an interface between the substrate and the thin film and reflected lights from a rear surface of the thin film; calculating an optical path length from the first interference wave to the second interference wave; calculating a film thickness of the thin film based on an intensity of the second interference wave; calculating an optical path difference between an optical path length of the substrate and the calculated optical path length, based on the calculated film thickness of the thin film; compensating for the optical path length from the first interference wave to the second interference wave based on the calculated optical path difference; and calculating a temperature of the object at the measurement point based on the compensated optical path length.

According to another aspect of the present invention, there is provided a computer readable recording medium having recorded thereon a program for executing, in a computer, a temperature measuring method for measuring a temperature of an object to be measured at a measurement point based on an interference wave of a reflected light received by a light receiving unit, by using a temperature measuring apparatus including a light source, a transmitting unit which transmits a light from the light source to the measurement point of the object that is a substrate on which a thin film is formed, and the light receiving unit which receives the reflected light reflected from the object, wherein the program enables the computer to operate as: a measuring unit which measures a first interference wave caused by a reflected light which is reflected at a surface of the substrate and received by the light receiving unit, and a second interference wave caused by reflected lights from an interface between the substrate and the thin film formed on the substrate and from a rear surface of the thin film; a first calculating unit which calculates an optical path length from the first interference wave to the second interference wave; a second calculating unit which calculates a film thickness of the thin film based on an intensity of the second interference wave; a third calculating unit which calculates an optical path difference between an optical path length of the substrate and the calculated optical path length, based on the calculated film thickness of the thin film; a compensating unit which compensates for the calculated optical path length from the first interference wave to the second interference wave based on the calculated optical path difference; and a fourth calculating unit which calculates a temperature of the object at the measurement point based on the compensated optical path length.

According to another aspect of the present invention, there is provided a computer executable program recorded in a recording medium for a computer to execute a temperature measuring method for measuring a temperature of an object to be measured at a measurement point based on an interference wave of a reflected light received by a light receiving unit, by using a temperature measuring apparatus including a light source, a transmitting unit which transmits a light from the light source to the measurement point of the object that is a substrate on which a thin film is formed, and the light receiving unit which receives the reflected light reflected from the object, the program enabling the computer to operate as: a measuring unit which measures a first interference wave caused by a reflected light which is reflected at a surface of the substrate and received by the light receiving unit, and a second interference wave caused by reflected lights from an interface between the substrate and the thin film formed on the substrate and from a rear surface of the thin film; a first calculating unit which calculates an optical path length from the first interference wave to the second interference wave; a second calculating unit which calculates a film thickness of the thin film based on an intensity of the second interference wave; a third calculating unit which calculates an optical path difference between an optical path length of the substrate and the calculated optical path length, based on the calculated film thickness of the thin film; a compensating unit which compensates for the calculated optical path length from the first interference wave to the second interference wave based on the calculated optical path difference; and a fourth calculating unit which calculates a temperature of the object at the measurement point based on the compensated optical path length.

BRIEF DESCRIPTION OF THE DRAWINGS

The above and other features and advantages of the present invention will become more apparent by describing in detail exemplary embodiments thereof with reference to the attached drawings in which:

FIGS. 3A and 3B are graphs specifically showing interference waveforms when there is no thin film;

FIGS. 4A and 4B are graphs specifically showing interference waveforms when there is a thin film;

FIG. 5 is a schematic diagram showing multiple reflections on a thin film;

DETAILED DESCRIPTION OF THE INVENTION

Figure 1:
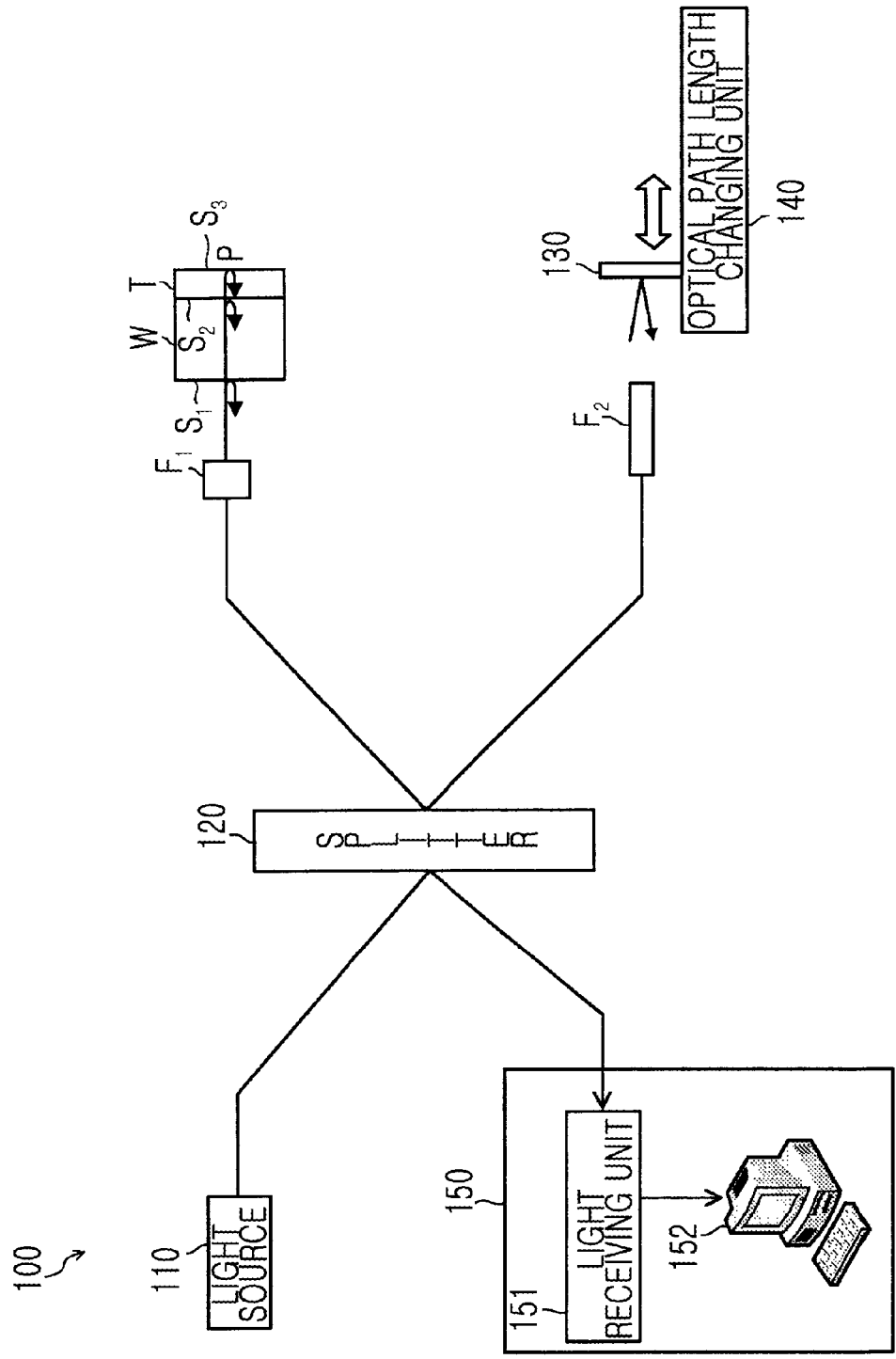
FIG. 1 is a diagram showing a configuration of a temperature measuring apparatus according to an embodiment.

The present invention will now be described more fully with reference to the accompanying drawings, in which exemplary embodiments of the invention are shown. Also, in the specification and drawings, components having substantially the same functions are denoted by the same reference numerals, and a repeated explanation thereof will not be given. Herein, a surface is a side where a light from a light source is incident. Also, a semiconductor wafer on which a thin film is formed is explained as an object to be measured, but the object is not limited to the semiconductor wafer. In addition, a silicon oxide ($SiO_2$) film is formed as the thin film on the semiconductor wafer, but the thin film is not limited to the $SiO_2$ film, and may be another film, for example, a silicon nitride ($Si_3N_4$) film, a resist film, a resin-based film, or a metal (copper (Cu), aluminum (Al), tungsten (W), titanium (Ti), or tantalum (Ta)) film.

Embodiments

FIG. 1 is a diagram showing a configuration of a temperature measuring apparatus 100 according to an embodiment. The temperature measuring apparatus 100 according to the present embodiment includes a light source 110, a splitter 120 for dividing a light from the light source 110 into a light (hereinafter, referred to as a measurement light) for temperature measurement and a reference light, a collimator fiber $F_1$ for transmitting the measurement light to a measurement point P of a semiconductor wafer (substrate) W on which a thin film ($SiO_2$ film) T is formed, wherein the semiconductor wafer W is an object to be measured, a reference light reflecting unit 130 for reflecting the reference light from the splitter 120, a collimator fiber $F_2$ for transmitting the reference light from the splitter 120 to the reference light reflecting unit 130, an optical path length changing unit 140 for changing an optical path length of the reference light reflected from the reference light reflecting unit 130, a signal processing apparatus 150 for measuring a temperature of the measurement point P based on an interference waveform caused by reflected lights of the measurement light and reference light. The signal processing apparatus 150 includes a light receiving unit 151 and a temperature calculating unit 152.

The light source 110 can use an arbitrary light as long as interference between the measurement light and the reference light can be measured, but since the temperature of the semiconductor wafer W is measured in the present embodiment, a reflected light from at least a distance (generally about 800 to 1500 μm) between a surface and a rear surface of the semiconductor wafer W may not cause interference.

In detail, a low-coherence light may be used. The low-coherence light denotes a light having a short coherence length. A center wavelength of the low-coherence light may be equal to or more than 1000 nm and pass through silicon (Si) which is a main component of the semiconductor wafer W. Also, a coherence length may be short.

The splitter 120 is, for example, an optical fiber coupler, but is not limited thereto. It is preferable that the splitter 120 splits a light into a reference light and a measurement light, and for example, the splitter 120 may be an optical waveguide type splitter, a semi-transmissive mirror, or the like.

For example, the reference light reflecting unit 130 may use a corner cube prism, a plane mirror, or the like. From among the corner cube prism and the plane mirror, considering that a reflected light is parallel to an incident light, it is preferable that the corner cube prism is used. However, the reference light reflecting unit 130 is not limited thereto as long as it can reflect the reference light, and may include, for example, a delay line.

The optical path length changing unit 140 includes a driving unit such as a motor for driving the reference light reflecting unit 130 in one direction parallel to an incident direction of a reference light. As such, the optical path length of the reference light reflected from the reference light reflecting unit 130 can be changed by driving the reference light reflecting unit 130 in one direction.

The light receiving unit 151 receives a reflected light of the measurement light reflected from the measurement point P of the semiconductor wafer W and a reflected light of the reference light reflected from the reference light reflecting unit 130, and converts the reflected lights into electric signals. Any one of various sensors may be used as the light receiving unit 151, but when the semiconductor wafer W using Si as a main component is used, the light receiving unit 151 may include a sensor using an indium gallium arsenide (InGaAs) device having sensitivity to a light having a wavelength of 800 to 1700 nm, considering that a light having a wavelength equal to or more than 1000 nm is used as the measurement light.

The temperature calculating unit 152 may be, for example a computer, and the temperature of the semiconductor wafer W is measured based on the interference waveform of the reflected lights detected by the light receiving unit 151, in detail, based on an optical path length between peaks of interference waves.

Figure 2:
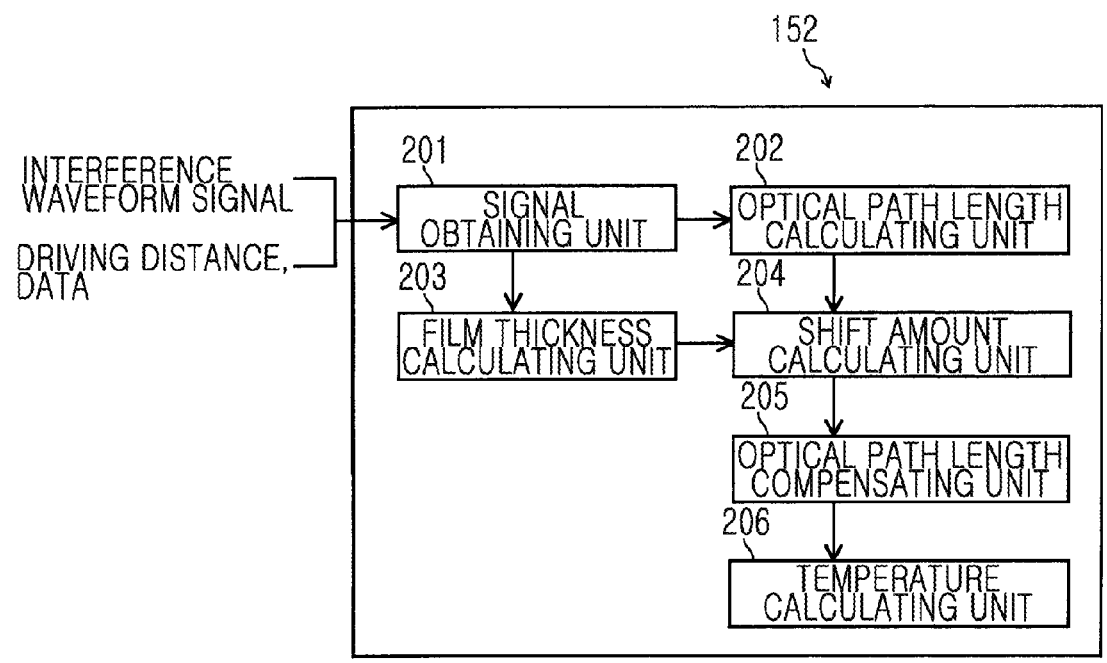
FIG. 2 is a functional diagram showing a configuration of a temperature calculating unit.

FIG. 2 is a functional diagram showing a configuration of the temperature calculating unit 152. The temperature calculating unit 152 includes a signal obtaining unit 201, an optical path length calculating unit 202, a film thickness calculating unit 203, a shift amount calculating unit 204, an optical path length compensating unit 205, and a temperature calculating unit 206. A function shown in FIG. 2 is performed by using hardware (for example, a hard disk drive (HDD), a central processing unit (CPU), and a memory) included in the temperature calculating unit 152. In detail, the function is performed when the CPU executes a program recorded on the HDD or the memory. Also, operations of each component shown in FIG. 2 will be described later when operations of the temperature measuring apparatus 100 is described.

(Specific Example of Interference Waveform of the Measurement Light and the Reference Light)

Hereinafter, a specific example of an interference waveform obtained by the light receiving unit 151 of the temperature measuring apparatus 100, and a temperature measuring method will be described. First, the semiconductor wafer W on which the thin film T is not formed will be described, and then the semiconductor wafer W on which the thin film T is formed and related problems will be described.

(The Case where Thin Film is not Formed)

Figure 3B:
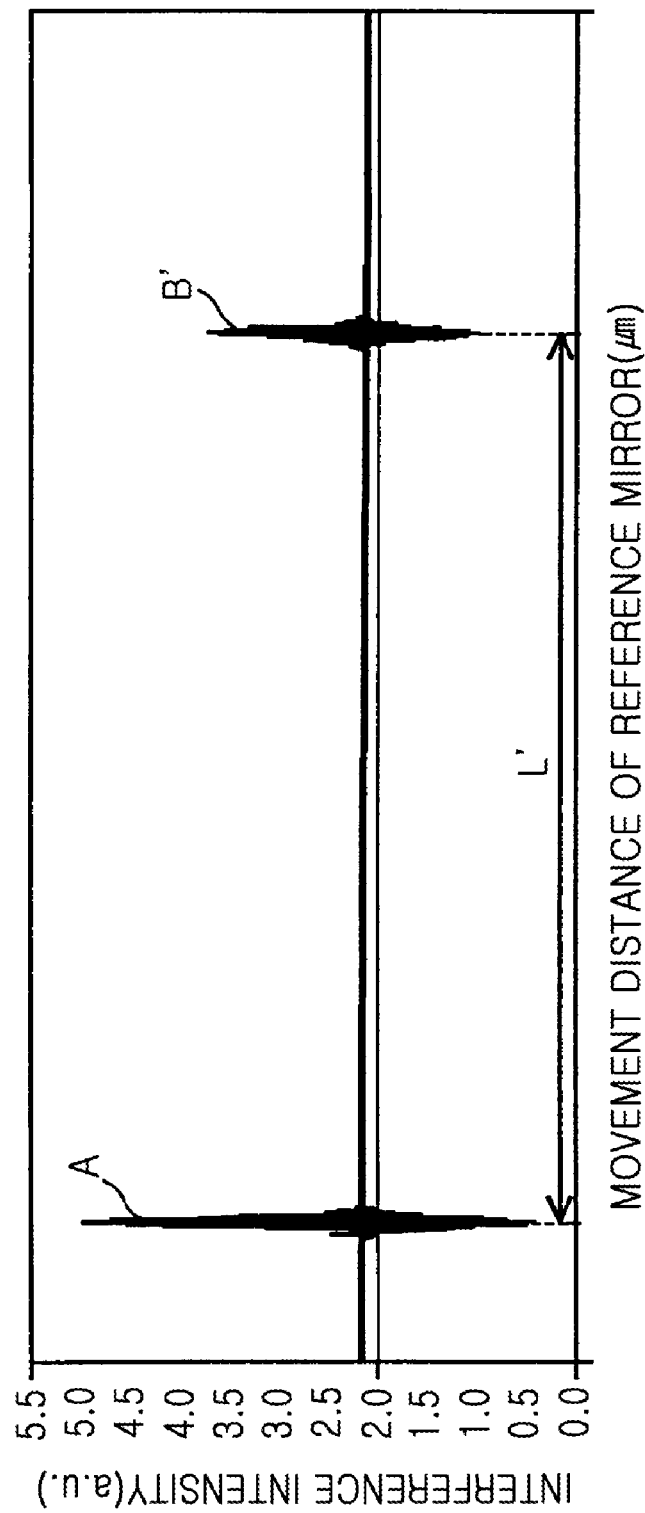

FIGS. 3A and 3B are graphs specifically showing interference waveforms obtained by the light receiving unit 151 of the temperature measuring apparatus 100. FIGS. 3A and 3B show interference waveforms of the measurement light and the reference light when the measurement light is incident on the semiconductor wafer W. FIG. 3A shows the interference waveform before a temperature change, and FIG. 3B shows the interference waveform after the temperature change. In FIGS. 3A and 3B, a vertical axis represents interference intensity and a horizontal axis represents a movement distance of the reference light reflecting unit 130, such as a reference mirror.

Referring to FIGS. 3A and 3B, when the reference light reflecting unit 130 is scanned in one direction, first, an interference wave A between the measurement light reflected by the surface of the semiconductor wafer W and the reference light occurs, and then an interference wave B between the measurement light reflected by the rear surface of the semiconductor wafer W and the reference light occurs.

Next, a method of measuring a temperature based on an interference wave between the measurement light and the reference light will be described with reference to FIGS. 3A and 3B. An example of a temperature measuring method based on an interference wave includes a temperature converting method using an optical path length change based on a temperature change. Herein, a temperature converting method using a change of location of the interference wave will be described.

Since the semiconductor wafer W expands and a refractive index of the semiconductor wafer W changes when the semiconductor wafer W is heated by a heater or the like, a location of the interference wave B before a temperature change is changed to a location of an interference wave B' after the temperature change, and thus a width between peaks of the interference waves is changed. The temperature change may be detected by measuring the width between the peaks of the interference waves at a measurement point P. For example, in the temperature measuring apparatus 100 of FIG. 1, since the width between the peaks of the interference waves corresponds to the movement distance of the reference light reflecting unit 130, the temperature change may be detected by measuring the movement distance of the reference light reflecting unit 130 corresponding to the width between the peaks of the interference waves.

When d denotes a thickness of the semiconductor wafer W and n denotes the refractive index of the semiconductor wafer W, misalignment of a peak location of an interference wave is dependent on a linear expansion coefficient $\alpha$ for the thickness d, and is mainly dependent on a temperature coefficient $\beta$ of refractive index change for the refractive index n change. Also, the misalignment is also dependent on a wavelength for the temperature coefficient $\beta$ of refractive index change.

Accordingly, a thickness d' and a refractive index n' of the wafer after the temperature change at the measurement point P may be defined as shown in Equation 1 below. Also, in Equation 1, $\Delta T$ denotes an amount of the temperature change at the measurement point P, $\alpha$ denotes the linear expansion coefficient, and $\beta$ denotes the temperature coefficient of refractive index change. Furthermore, d and n respectively denote the thickness and the refractive index at the measurement point P before the temperature change.

$$d'=d\cdot(1+\alpha\Delta T), n'=n\cdot(1+\beta\Delta T) \quad \text{[Equation 1]}$$

As shown in Equation 1 above, the optical path length of the measurement light passing through the measurement point P changes according to the temperature change. The optical path length is generally obtained by multiplying the thickness d by the refractive index n. Accordingly, when L denotes the optical path length of the measurement light passing through the measurement point P before the temperature change, and L' denotes the optical path length after a temperature at the measurement point P is changed by $\Delta T$, the optical path lengths L and L' may be represented by Equation 2 below.

$$L=d\cdot n, L'=d'\cdot n' \quad \text{[Equation 2]}$$

Accordingly, a difference (L'−L) between the optical path lengths L and L' of the measurement light respectively before and after the temperature change at the measurement point P is defined by Equation 3 below, by referring to Equations 1 and 2. Also in Equation 3 below, small terms are omitted in consideration of $\alpha \cdot \beta \ll \alpha$, $\alpha \cdot \beta \ll \beta$.

[Equation 3]
$$L' - L = d' \cdot n' - d \cdot n$$
$$= d \cdot n \cdot (\alpha \cdot \beta) \cdot \Delta T$$
$$= L \cdot (\alpha + \beta) \cdot \Delta T$$

Here, an optical path length of a measurement light at a measurement point corresponds to a width between peaks of an interference wave between the measurement light and a reference light. Accordingly, if a linear expansion coefficient $\alpha$ and a temperature coefficient $\beta$ of refractive index change are obtained in advance, a width between peaks of an interference waveform between the measurement light and a reference light at a measurement point can be measured and converted to a temperature of the measurement point by using Equation 3.

As such, if a temperature is converted from an interference wave, since an optical path length between peaks of an interference wave changes according to a linear expansion coefficient $\alpha$ and a temperature coefficient $\beta$ of refractive index change as described above, the linear expansion coefficient $\alpha$ and the temperature coefficient $\beta$ of refractive index change need to be obtained in advance. A linear expansion coefficient $\alpha$ and a temperature coefficient $\beta$ of refractive index change of a material including a semiconductor wafer may be generally dependent on a temperature in a certain temperature range. For example, in general, since a linear expansion coefficient $\alpha$ is not much changed when a temperature ranges from 0 to 100° C., the linear expansion coefficient $\alpha$ may be regarded as constant. However, in some materials, since a linear expansion coefficient $\alpha$ increases as a temperature increases when a temperature is equal to or higher than 100° C., a temperature dependency of the linear expansion coefficient $\alpha$ cannot be disregarded in this case. Likewise, there are cases where a temperature dependency of a temperature coefficient $\beta$ of refractive index change cannot be disregarded in a certain temperature range.

For example, it is known that a linear expansion coefficient $\alpha$ and a temperature coefficient $\beta$ of refractive index change of Si constituting a semiconductor wafer approximate to, for example, a quadratic curve in a temperature range of 0 to 500° C. As such, since a linear expansion coefficient $\alpha$ and a temperature coefficient $\beta$ of refractive index change are dependent on temperature, a temperature may be more accurately calculated by obtaining the linear expansion coefficient $\alpha$ and the temperature coefficient $\beta$ of refractive index change according to temperatures in advance and calculating the temperature in consideration of the obtained linear expansion coefficient $\alpha$ and temperature coefficient $\beta$ of refractive index change.

However, the temperature measuring method based on an interference wave between a measurement light and a reference light is not limited to the above-described method, and for example, a method using an absorbance intensity change based on a temperature change may be used or a method combining an optical path length change based on a temperature change and an absorbance intensity change based on a temperature change may be used.

(The Case where the Thin Film is Formed)

FIGS. 4A and 4B are graphs showing the interference waveforms between the measurement light and the reference light when the measurement light is emitted to the semiconductor wafer W. Also, in FIGS. 4A and 4B, a vertical axis represents interference intensity and a horizontal axis denotes a movement distance of the reference light reflecting unit 130, such as a reference mirror.

FIG. 4A shows the case where the film thickness of the thin film T is sufficiently thick compared to a coherence length of the low-coherence light. In this case, the measurement light emitted to the semiconductor wafer W is reflected from three locations, which are a surface $S_1$ of the semiconductor wafer W, an interface $S_2$ between the semiconductor wafer W and the thin film T, and a rear surface $S_3$ of the thin film T shown in FIG. 1. Also, the measurement light reflected from the 3 locations interferes at a location where its optical path length is approximately identical to the optical path length of the reference light reflected from the reference light reflecting unit 130. Accordingly, as shown in FIG. 4A, three interference waves C through E are observed.

FIG. 4B shows the case where the film thickness of the thin film T is less than or equal to the coherence length of the low-coherence light. In this case, although the measurement light emitted to the semiconductor wafer W is reflected from the three locations, which are the surface $S_1$ of the semiconductor wafer W, the interface $S_2$ between the semiconductor wafer W and the thin film T, and the rear surface $S_3$ of the thin film T, as in FIG. 4A, since the film thickness of the thin film T is thin (less than or equal to the coherence length of the low-coherence light), the interference waves D and E of FIG. 4A multiple-reflected between the interface $S_2$ between the semiconductor wafer W and the thin film T, and the rear surface $S_3$ of the thin film T overlap with each other, and thus become one interference wave F.

FIG. 5 is a schematic diagram showing multiple reflections on the thin film T. As shown in FIG. 5, the measurement light incident on the semiconductor wafer W is separated by multiple regression reflection between the interface $S_2$ between the semiconductor wafer W and the thin film T, and the rear surface $S_3$ of the thin film T. Each reflected light obtained by separating the measurement light interferes with the reference light, thereby forming a plurality of interference waves (1), (2), (3), (4), (5) . . . , as shown in FIG. 5. As described above, the plurality of interference waves (1), (2), (3), (4), (5) . . . are not separated but overlap with each other to be detected as the interference wave F.

As such, when the film thickness of the thin film T is less than or equal to the coherence length of the low-coherence light, a plurality of interference waves generated between the interface $S_2$ between the semiconductor wafer W and the thin film T, and the rear surface $S_3$ of the thin film T overlap with each other and become the interference wave F, and thus a measured optical path length $L_1$ from a peak of the interference wave C to a peak of the interference wave F and an actual optical path length $L_2$ constituting an optical path length from the surface of the semiconductor wafer W to the rear surface of the semiconductor wafer W may be misaligned by an optical path length of $\Delta L$.

(Compensation for the Optical Path Length)

As described above, when the thin film T is formed on the semiconductor wafer W, the peak location of the interference wave F is shifted by $\Delta L$ as described with reference to FIGS. 4A and 4B. Accordingly, the measured optical path length L1 needs to be compensated by the shifted amount $\Delta L$.

In the present embodiment, by performing operations 1 through 3 below, the temperature of the semiconductor wafer W is measured after the measured optical path length is compensated.

Operation 1: The film thickness of the thin film T is calculated from the interference intensity of the interference wave F described with reference to FIGS. 4A and 4B, or an interference intensity ratio of the interference wave C and the interference wave F.

Operation 2: The misalignment amount ΔL (hereinafter, referred to as a shift amount ΔL) of the optical path length is obtained from the film thickness of the thin film T.

Operation 3: The actual optical path length $L_2$ is obtained by compensating for the measured optical path length $L_1$ based on the obtained shift amount ΔL.

Operations 1 through 3 will now be described in detail. Also, hereinafter, a case where the thin film T is etched is described.

(Equations)

First, equations below, which are required to compensate for an optical path length, will be described.

Equation 4 below represents a relationship between the film thickness of the thin film T and the interference intensity.

[Equation 4]

$$R(k, d) = |\rho|^2 = \frac{\rho_2^2 + \rho_1^2 + 2\rho_2\rho_1\cos 2\delta}{1 + (\rho_2\rho_1)^2 + 2\rho_2\rho_1\cos 2\delta} \quad (4)$$

In Equation 4, $\rho_1$ denotes a Fresnel coefficient (amplitude reflection coefficient) of a reflected light incident from the thin film T to the atmosphere, and is represented by Equation 5 below.

$$\rho_1 = (n_1 - n_0)/(n_1 + n_0) \quad \text{[Equation 5]}$$

In Equation 4, $\rho_2$ denotes a Fresnel coefficient (amplitude reflection coefficient) of a reflected light incident from the semiconductor wafer W to the thin film T, and is represented by Equation 6 below.

$$\rho_2 = (n_2 - n_1)/(n_2 + n_1) \quad \text{[Equation 6]}$$

Equation 7 below shows a relationship between the thickness d of the thin film T and the interference intensity, when a difference between optical path lengths of the semiconductor wafer W and a reference side) is Δl.

[Equation 7]

$$\tilde{I}_1 = \int E_1 E_2 \sqrt{R(k,d)} \cos\{2k\Delta l + \phi(k,d)\} \cdot S(k) dk \quad (7)$$

In Equation 7, $\phi(k, d)$ denotes a phase shift according to a wave number k, and is represented by Equation 8 below.

[Equation 8]

$$\phi(k, d) = \tan^{-1}\frac{\rho_1(\rho_2^2 - 1)\sin(2\delta)}{\rho_2(1 + \rho_1^2) + \rho_1(1 + \rho_2^2)\cos(2\delta)} \quad (8)$$

Also, in Equation 7, S(k) denotes power spectrum density, and is represented by Equation 9 below if a power spectrum distribution is Gaussian distribution. Also, in an actual calculation, as will be described later, a waveform actually measured by using a spectrum analyzer is used to improve a precision.

[Equation 9]

$$S(k) \approx \frac{2\sqrt{\ln 2}}{\Delta k \sqrt{\pi}} \exp\left[-\left(\frac{k - k_0}{\frac{\Delta k}{2\sqrt{\ln 2}}}\right)^2\right] \quad (9)$$

Also, other parameters used in Equation 4 through 9 are defined as follows.

R: Reflectance
k: wave number of measurement light
d: Film thickness of thin film T
δ: $kn_1 d$
$n_0$: Refractive index of atmosphere
$n_1$: Refractive index of thin film T
$n_2$: Refractive index of semiconductor wafer W
$E_1$: Electric field at reference side
$E_2$: Electric field at semiconductor wafer W side (1: Calculation of the Film Thickness of the Thin Film)

Figure 6:
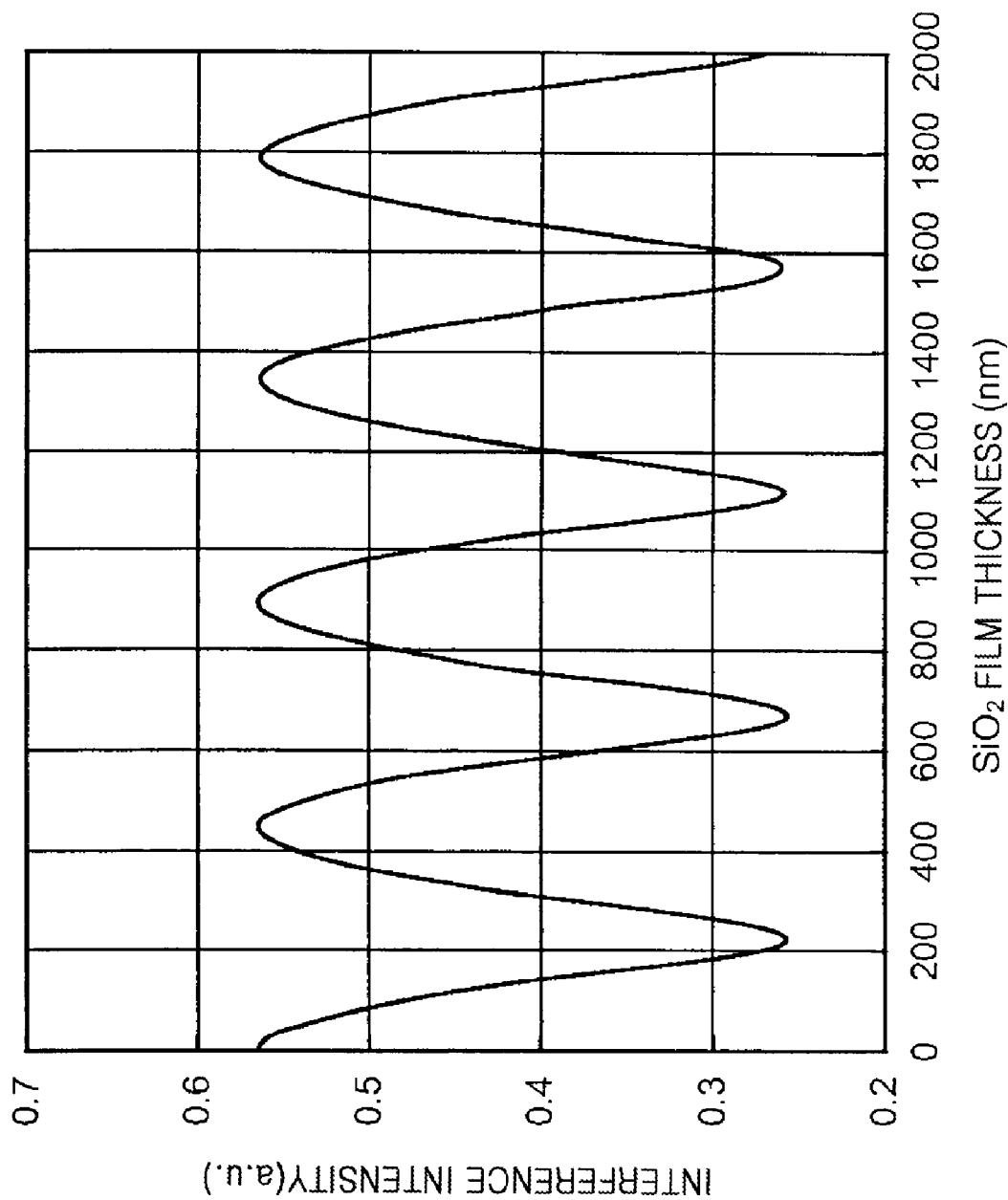
FIG. 6 is a graph showing a relationship between a film thickness of a thin film and interference intensity.

FIG. 6 is a graph showing a relationship between the film thickness of the thin film T and interference intensity when an $SiO_2$ film is formed as the thin film T on the semiconductor wafer W. In FIG. 6, a vertical axis represents the interference intensity and a horizontal axis represents the film thickness of the thin film T. Also, the graph of FIG. 6 is calculated by using Equation 7 above.

A maximum value of an interference waveform with respect to a film thickness is calculated from Equation 7, by repeatedly calculating Equation 7 per each 1 nm while a thickness of an oxide layer is from 0 to 2100 nm. In detail, while changing a difference Δl between optical path lengths of a semiconductor wafer side and a reference side by an interval of 0.05 μm from −50 μm to +50 μm, a light intensity S(k) of an actual waveform of a light source pre-measured by using a spectrum analyzer is changed according to wavelengths per each interval of 1 nm with respect to a spectrum range (wavelength from 1205 to 1405) of the light source. Also, since both of a refractive index $n_1$ (about 1.447) of $SiO_2$ and a refractive index $n_2$ (about 3.54) of Si actually have wavelength dispersion, a more accurate value is substituted according to wavelengths in order to improve calculation accuracy, and an intensity of a light emitting range is integrated with respect to one optical path difference.

When above calculation process is performed while changing an optical path difference by an interval of 0.05 μm, an interference waveform when a reference mirror is moved with respect to one oxide film thickness can be calculated. In FIG. 6, the calculation results and the oxide film thickness are plotted by matching the maximum value and the oxide film thickness.

As described above, the film thickness of the thin film may be calculated from the relationship shown in FIG. 6, in detail, Equations 4 through 9 and each of parameters, such as an actual light emitting waveform and a refractive index, may be pre-stored in a nonvolatile memory or the like, and the film thickness of the thin film T may be calculated by applying the interference intensity of the interference wave F measured by the light receiving unit 151 to FIG. 6.

Also, as shown in FIG. 6, the interference intensity periodically changes according to the film thickness of the thin film T. In other words, the film thickness of the thin film T and the interference intensity do not correspond in a one-to-one manner. Thus, in the present embodiment, an initial film thickness of the thin film T is pre-obtained, and the film thickness of the thin film T is calculated from the interference intensity based on the initial film thickness and the relationship shown in FIG. 6. Also, the film thickness is calculated in a direction in which the film thickness is decreased (from right to left in the horizontal axis of FIG. 6) during etching, and is calculated in a direction in which the film thickness is increased (from left to right in the horizontal axis of FIG. 6) during deposition.

Figure 7:
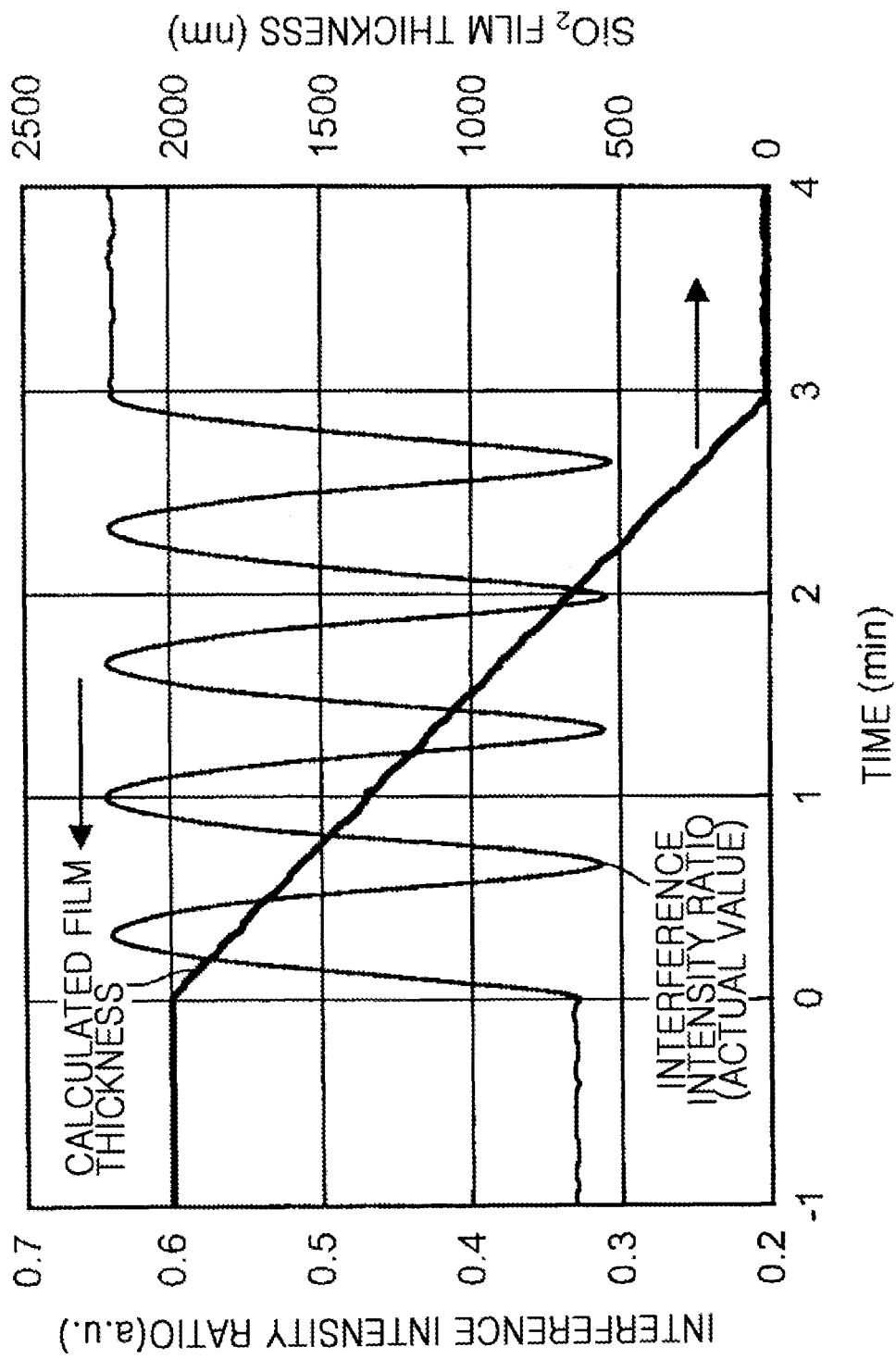
FIG. 7 is a graph showing an interference intensity ratio and etching time dependency of a film thickness of a thin film, which is calculated from the interference intensity ratio.

FIG. 7 is a graph showing an interference intensity ratio and etching time dependency of the film thickness of the thin film T, which is calculated from the interference intensity ratio. In FIG. 7, the film thickness of the thin film T obtained by applying an interference intensity ratio, when the thin film T formed on the semiconductor wafer W is actually etched, to FIG. 6 is shown. In FIG. 7, a left vertical axis represents the interference intensity ratio, a right vertical axis represents the film thickness, and a horizontal axis represents an etching time (0 when etching is started). In FIG. 7, the film thickness of the thin film T is calculated from a relationship between the interference intensity ratio (value obtained by dividing the interference intensity of the interference wave F of FIG. 4B by the interference intensity of the interference wave C) and the film thickness of the thin film T, instead of the interference intensity of the interference wave F. By using the interference intensity ratio, a change in interference intensity due to the light source 110 or the collimator fiber $F_1$ that transmits the light from the light source 110 can be canceled, and thus the film thickness of the thin film T can be more accurately obtained.

Figure 8:
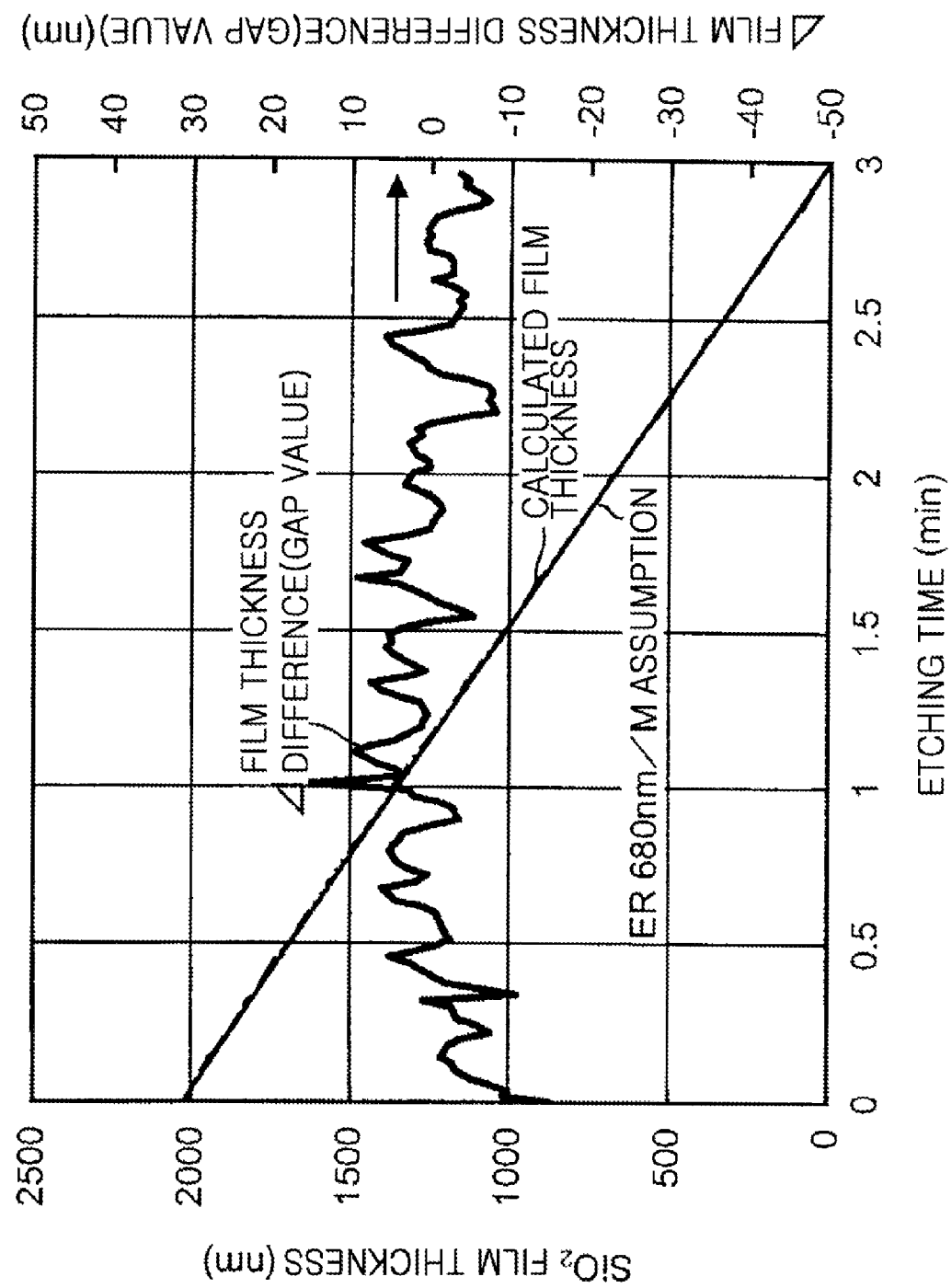
FIG. 8 is a graph showing a film thickness calculated from an interference intensity ratio, and a gap value.

FIG. 8 is a graph showing the film thickness of the thin film T calculated from an interference intensity ratio, and a film thickness difference (gap value) between a film thickness of the thin film T calculated assuming that an etching rate is constant (680 nm/min) and the film thickness of the thin film T calculated from the interference intensity ratio. In FIG. 8, a left vertical axis represents the film thickness, a right vertical axis represents the film thickness difference (gap value), and a horizontal axis represents an etching time (0 when etching is started). In FIG. 8, the film thickness of the thin film T assuming that the etching rate is constant (680 nm/min) is shown as a solid line, and the film thickness of the thin film T calculated from the interference intensity ratio is shown as an alternating long and short dash line. Also, since the film thickness of the thin film T cannot be directly measured during etching, it is assumed that the etching rate of the thin film T is constant in FIG. 8.

As shown in FIG. 8, the film thickness difference (gap value) between the film thickness of the thin film T calculated from the interference intensity ratio and the film thickness of the thin film T calculated assuming that the etching rate is constant is within a range of about ±15 nm, and thus the film thickness of the thin film T during etching can be precisely calculated.

(2: Calculation of the Shift Amount)

Figure 9:
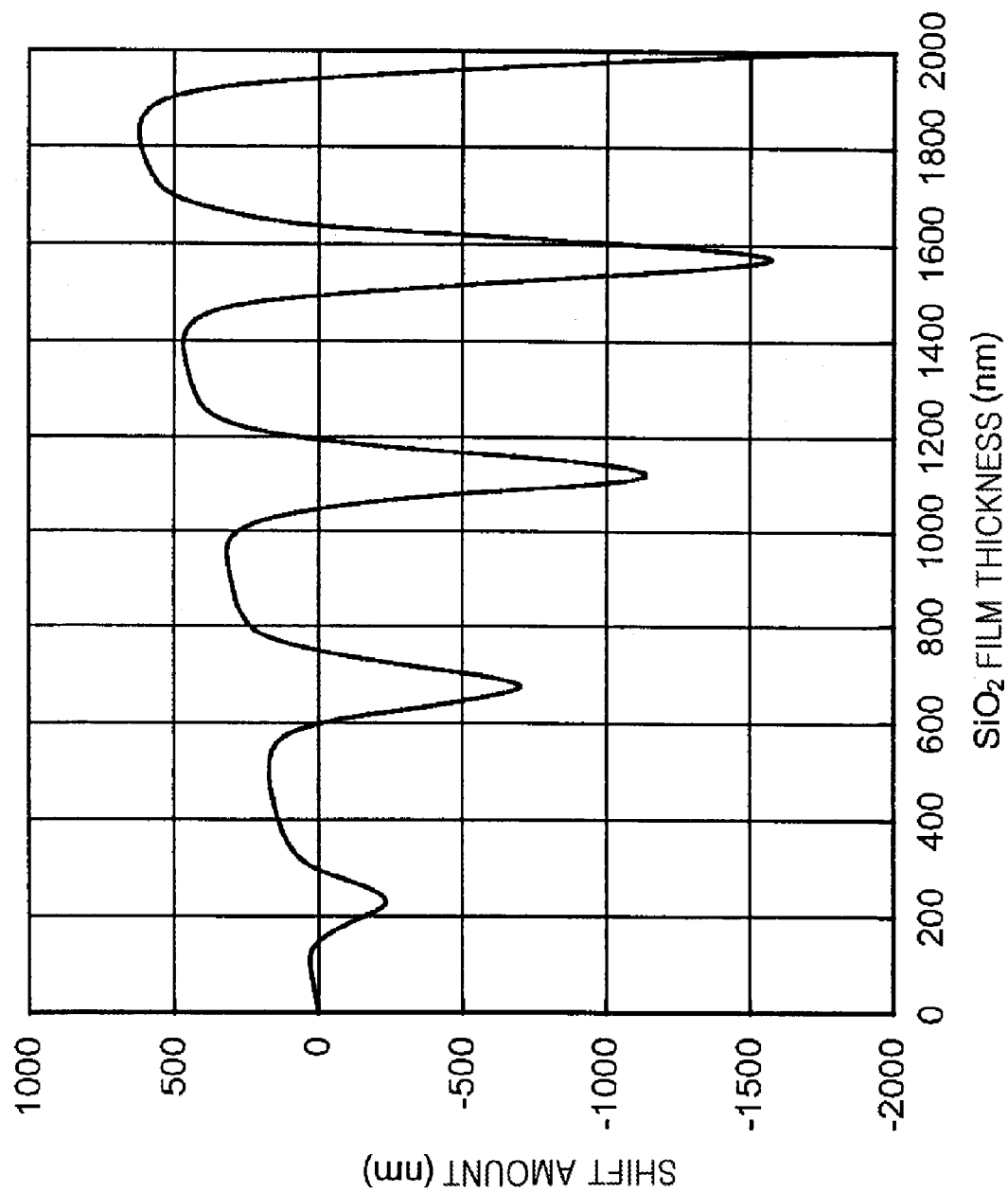
FIG. 9 is a graph showing a relationship between a film thickness and a shift amount of an interference wave.

FIG. 9 is a graph showing a relationship between the film thickness of the thin film T and the shift amount ΔL of the interference wave F. In FIG. 9, a vertical axis represents the shift amount ΔL of the interference wave F, and a horizontal axis represents the film thickness of the thin film T. Also, although the interference waveform is obtained according to oxide film thicknesses in the above description of Equation 7, in FIG. 9, a center of the interference waveform obtained according to oxide film thicknesses is calculated, and the center of the interference waveform is plotted as a shift amount in an optical path difference direction. In detail, the center is obtained by using a value of interference waveform higher than DC intensity. Also, for a value of interference waveform smaller than DC component, the center may be obtained by using a waveform regressed to DC intensity, or alternatively after adding a positive waveform. A maximum value or the like of the interference waveform other than the center may be obtained by approximating the maximum value or the like to a polynomial expression or a Gaussian distribution.

As described above, the shift amount ΔL may be calculated from the relationship shown in FIG. 9, in detail, Equations 7 through 9 and each parameter may be pre-stored in a nonvolatile memory or the like, and the shift amount ΔL of the interference wave F may be calculated from the calculated film thickness of the thin film T and FIG. 9.

(3: Compensation for the Optical Path Length)

Lastly, an optical path length between peaks of an interference wave observed by the light receiving unit 151 is compensated based on the obtained shift amount ΔL (in detail, the calculated optical path length is compensated by the shift amount ΔL).

(Operations of the Temperature Measuring Apparatus 100)

Figure 10:
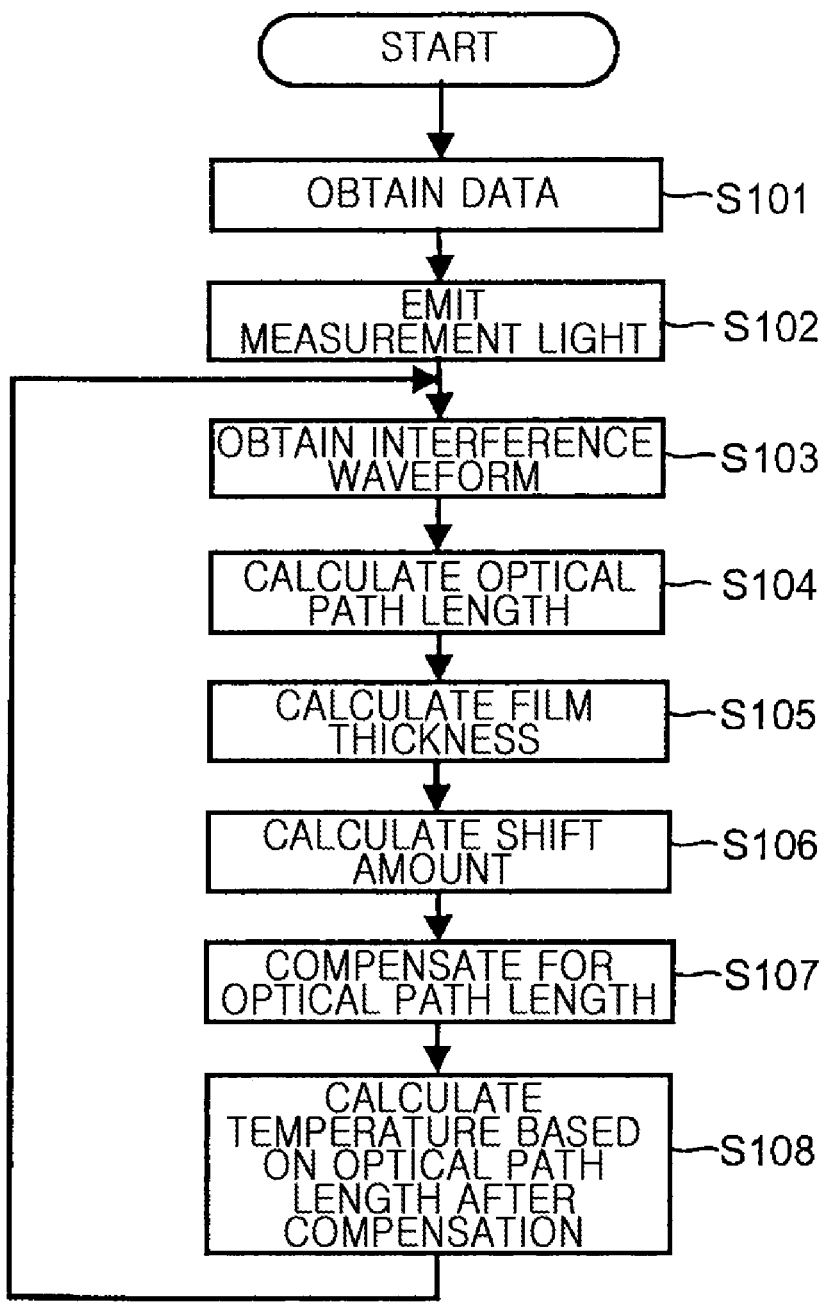
FIG. 10 is a flowchart showing operations of a temperature measuring apparatus.

FIG. 10 is a flowchart showing operations of the temperature measuring apparatus 100.

Hereinafter, the operations of the temperature measuring apparatus 100 will be described with reference to FIGS. 1, 8, and 9.

In operation S101, the signal obtaining unit 201 obtains data required to calculate the temperature of the semiconductor wafer W, such as the linear expansion coefficient α or the temperature coefficient β of refractive index change of the semiconductor wafer W, Equations 3 through 9 or various parameters, the film thickness of the thin film T, and the optical path length of the semiconductor wafer W at a predetermined temperature, from an upper level controller (for example, a host or an integrated metrology (IM) apparatus connected to the temperature measuring apparatus 100.

Also, the data required to calculate the temperature of the semiconductor wafer W described above may be pre-obtained and pre-stored in an HDD or nonvolatile memory included in the temperature calculating unit 152.

In operation S102, the light from the light source 110 is incident on the splitter 120, and is divided into two by the splitter 120. Here, one light (measurement light) is emitted to the semiconductor wafer W through the collimator fiber $F_1$.

In operation S103, the measurement light emitted to the semiconductor wafer W is reflected from the surface $S_1$ of the semiconductor wafer W or the interface $S_2$ between the thin film T and the semiconductor wafer W. Also, another light (reference light) from the splitter 120 is emitted from the collimator fiber $F_2$ and reflected by the reference light reflecting unit 130. Then, the reflected light of the reference light is incident on the splitter 120, wave-combines again with the reflected light of the measurement light, and is received by the light receiving unit 151, thereby being obtained by the signal obtaining unit 201 as a waveform signal.

In operation S104, the optical path length calculating unit 202 calculates the optical path length $L_1$ between the peaks of the interference waves C and F described above with reference to FIG. 4B based on the waveform signal obtained by the signal obtaining unit 201 and a driving distance signal.

In operation S105, the film thickness calculating unit 203 calculates the film thickness of the thin film T from the relationship (in detail, Equation 7) between the film thickness of the thin film T and the peak interference ratio described with reference to FIG. 6.

In operation S106, the shift amount calculating unit 204 calculates the shift amount ΔL corresponding to the film thickness of the thin film T calculated by the film thickness calculating unit 203 based on the relationship (in detail, Equation 7) between the film thickness of the thin film T and the shift amount ΔL of the interference wave F described with reference to FIG. 9.

Here, an order of performing operations S104 through S106 is not necessarily limited to the order shown in FIG. 10, and may be suitably changed or performed in parallel.

In operation S107, the optical path length compensating unit 205 calculates the actual optical path length $L_2$ by compensating for the optical path length $L_1$ calculated by the optical path length calculating unit 202 by the shift amount ΔL calculated by the shift amount calculating unit 204.

In operation S108, the temperature calculating unit 206 calculates the temperature of the semiconductor wafer W based on the optical path length compensated by the optical path length compensating unit 206. In detail, the linear expansion coefficient α and the temperature coefficient β of refractive index change of the semiconductor wafer W, and the compensated optical path length (actual optical path length $L_2$), which are pre-stored, are substituted in Equation 3 above to calculate the temperature of the semiconductor wafer W.

The temperature calculating unit 152 calculates the temperature of the semiconductor wafer W by obtaining the waveform signal from the light receiving unit 151 and the driving distance signal of the reference light reflecting unit 130 from the optical path length changing unit 140 at predetermined time intervals, until the temperature calculating unit 152 stops operating.

EXAMPLES

Example 1

Figure 11:
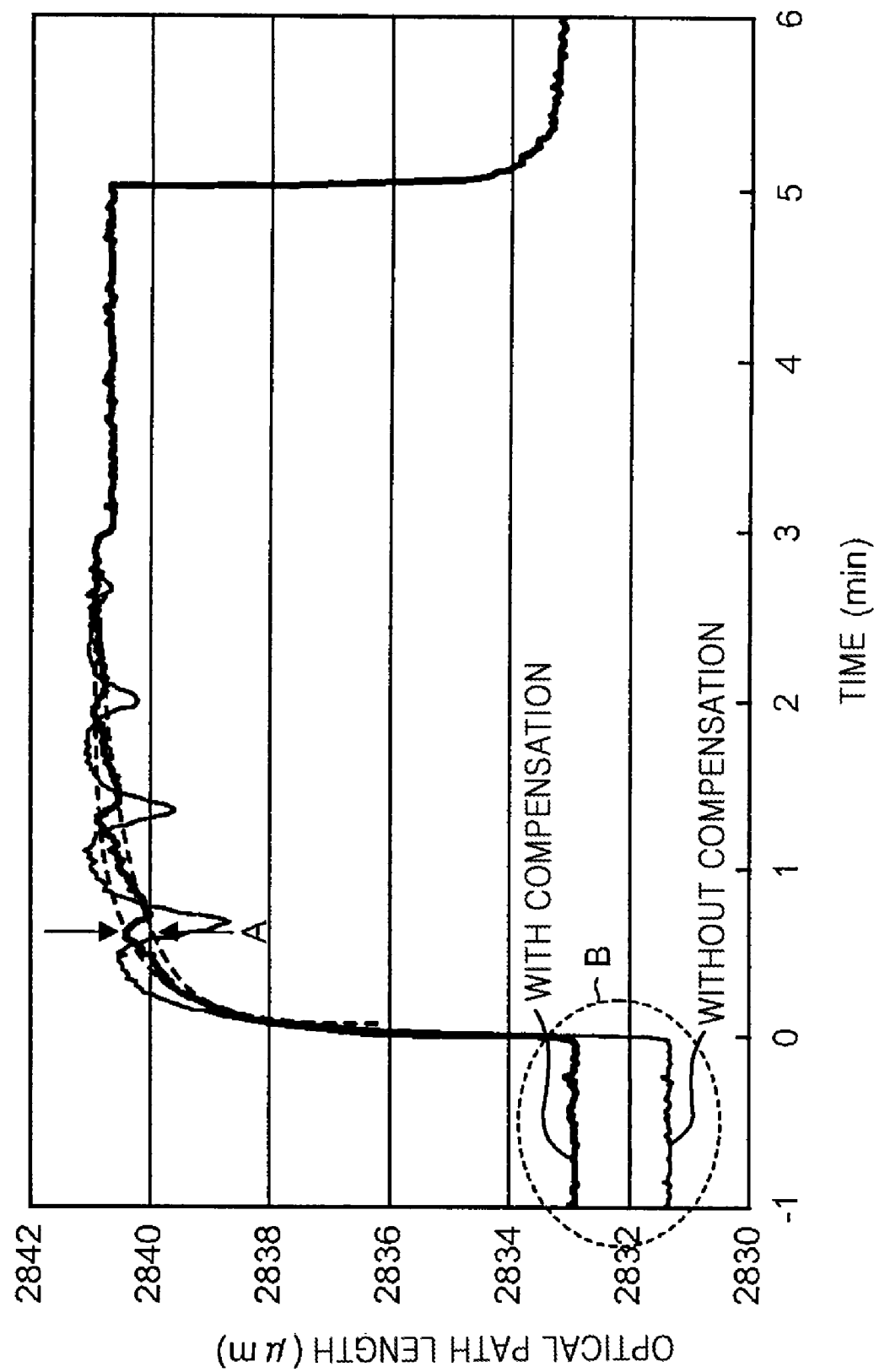
FIG. 11 is a graph showing a result of measuring an optical path length according to Example 1.

FIG. 11 is a graph showing a result of measuring an optical path length according to Example 1. In FIG. 11, a vertical axis represents a calculated optical path length, and a horizontal axis represents an etching time (0 when etching is started). FIG. 11 shows an optical path length measured while etching a semiconductor wafer having a diameter of 300 mm on which a thin film ($SiO_2$ film) having a film thickness of about 2 μm (precisely 1993 nm) is formed. A measurement point is a center of the semiconductor wafer. Also in FIG. 11, a case when the optical path length is compensated (with compensation) and a case when the optical path length is not compensated (without compensation) are shown.

As shown in FIG. 11, when the optical path length is not compensated, it can be seen that the optical path length periodically largely changes while etching is being performed. This is because, as described above, interference intensity due to reflection at a thin film periodically changes according to a film thickness of the thin film. Meanwhile, when the optical path length is compensated, it can be seen that the optical path length barely changes.

When there is no compensation, the change in the optical path length during etching ranged about 2.6 μm (range from −10 to 3° C. when converted into temperature), but when there is compensation, the range of change in the optical path length during etching was suppressed to about 0.5 μm (−0.3 to 0.3° C. when converted into temperature) (refer to reference numeral A in FIG. 11). At this point, when the optical path length is compensated, it can be determined that the optical path length, i.e., the temperature, of the semiconductor wafer can be precisely measured. Also, since an accurate value of the optical path length even before etching can be obtained compared to conventional technology, the present embodiment is advantageous in the processing of the semiconductor wafer W (refer to reference numeral B in FIG. 11).

Figure 12:
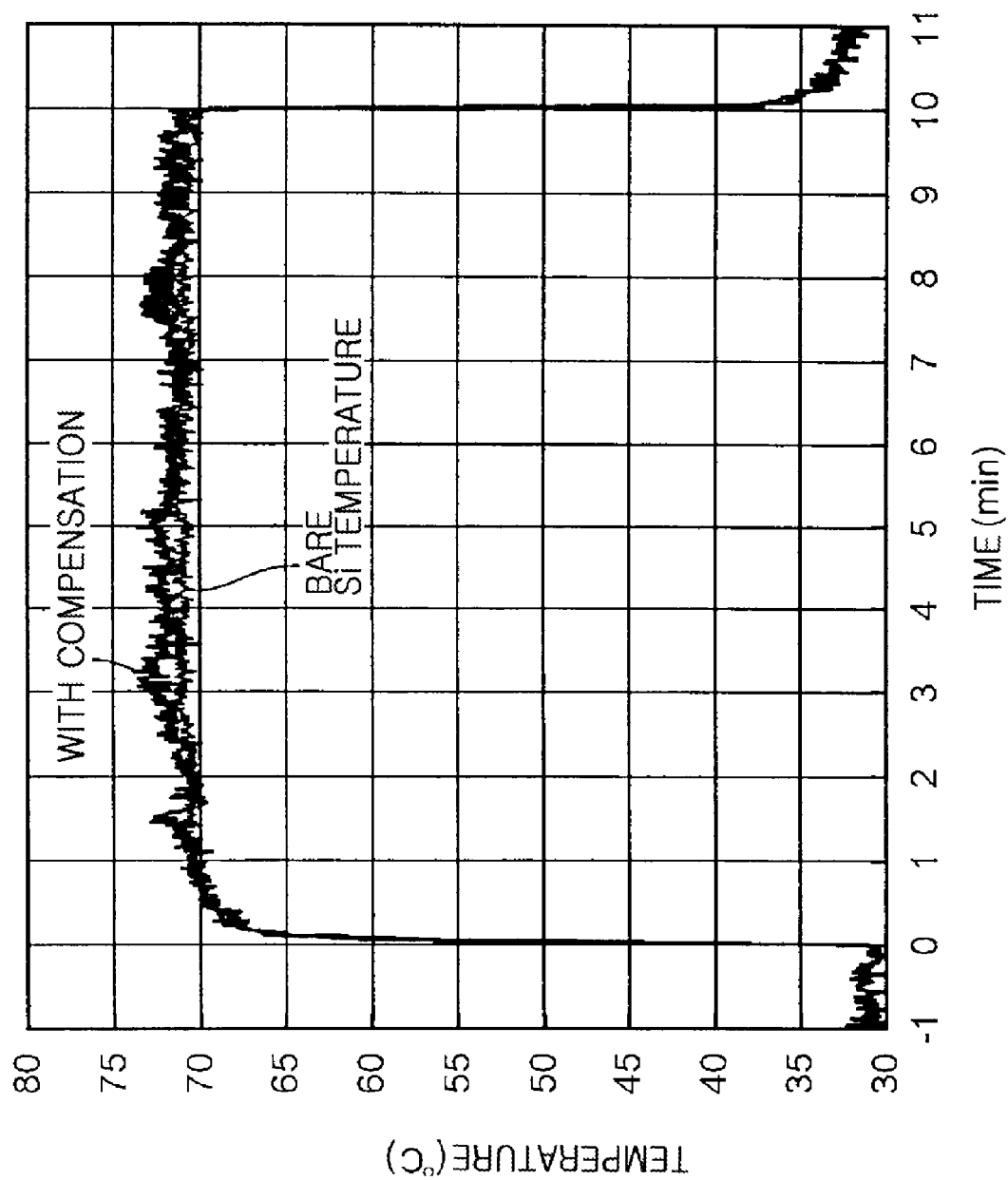
FIG. 12 is a graph showing a result of measuring a temperature according to Example 2, when there is compensation.
Figure 13:
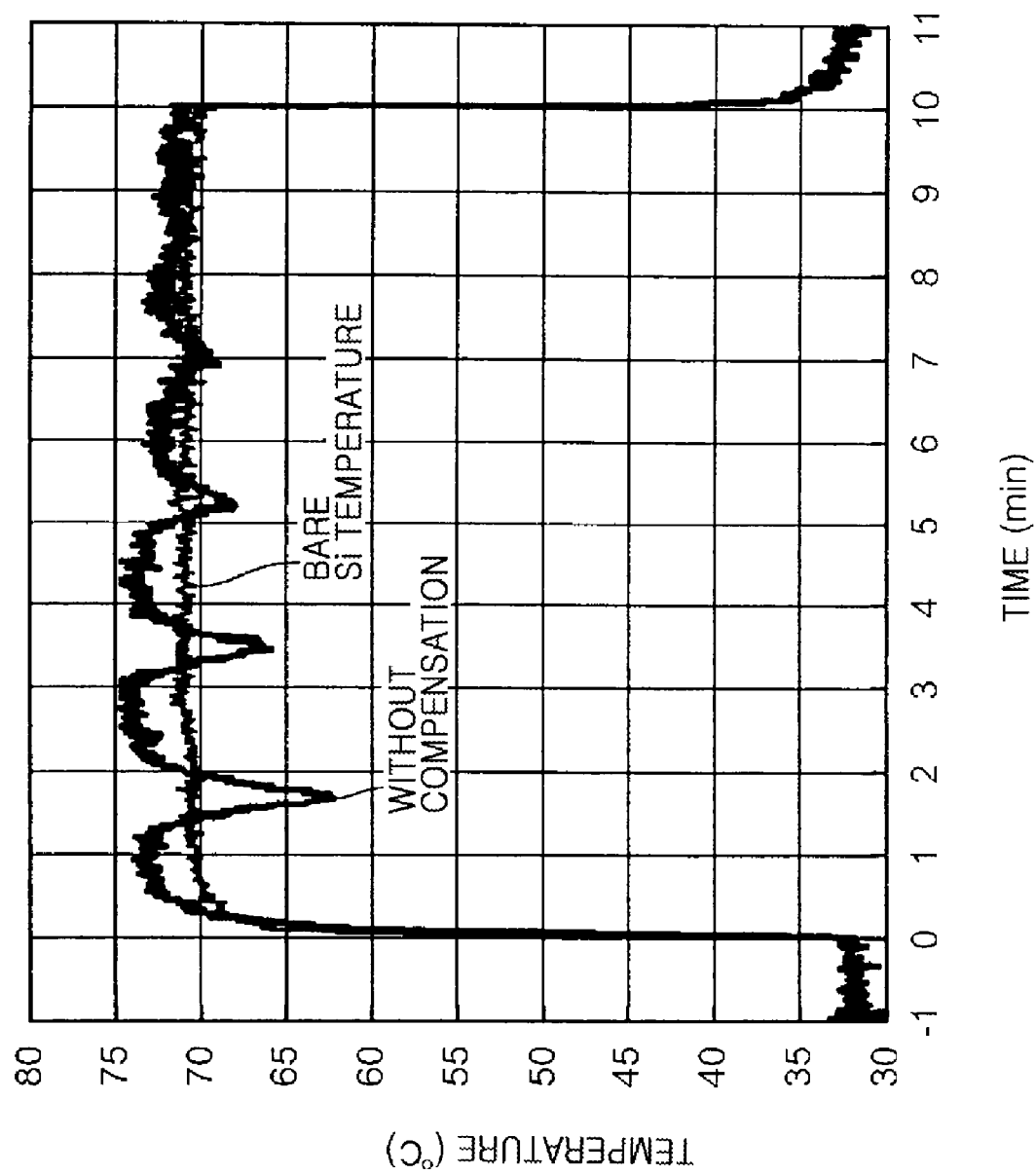
FIG. 13 is a graph showing a result of measuring a temperature according to Comparative Example 1, when there is no compensation.

FIGS. 12 and 13 are graphs respectively showing results of measuring a temperature according to Example 2 (when an optical path length is compensated), and according to Comparative Example 1 (when an optical path length is not compensated). In FIGS. 12 and 13, a vertical axis represents a measured temperature, and a horizontal axis represents an etching time (0 when etching is started). FIG. 12 shows the result of measuring the temperature while etching a semiconductor wafer having a diameter of 300 mm and on which a thin film ($SiO_2$ film) having a film thickness of about 2 μm (precisely 1993 nm) is formed, and at the same time, shows the result of measuring the temperature when a bare Si wafer on which a thin film is not formed is etched for comparison. A measurement point of temperature is a center of the semiconductor wafer.

Example 2

FIG. 12 shows the result of measuring a temperature when the optical path length is compensated. As shown in FIG. 12, when the optical path length is compensated, a change in the temperature of the semiconductor wafer measured during etching is small. Also, even by comparing such a result with the result of measuring the temperature when the bare Si wafer is etched, it can be understood that the temperature change of the semiconductor wafer is approximately the same as the temperature change of the bare Si wafer, and thus the temperature of the semiconductor wafer can be precisely measured.

Comparative Example 1

FIG. 13 shows the result of measuring a temperature when the optical path length is not compensated. As shown in FIG. 13, when the optical path length is not compensated, the temperature of the semiconductor wafer measured during etching is periodically largely changed. This is because, as described above, interference intensity due to reflection at a thin film periodically changes according to a film thickness of the thin film. Also, even when the result is compared with the result of measuring a temperature when a bare Si wafer is etched, it can be seen that the temperature changes are largely different and thus the temperature of the semiconductor wafer is not accurately measured.

As described above, since the temperature measuring apparatus 100 according to the present embodiment obtains the film thickness of the thin film T from the interference intensity of the interference wave, calculates the shift amount of the optical path length from the obtained film thickness of the thin film, and compensates for a distance between peaks (optical path length) of the interference wave based on the calculated shift amount, the temperature of the semiconductor wafer W can be precisely measured even when the thin film T is formed on the semiconductor wafer W.

In the above embodiment, the compensating for the optical path length measured in a time domain method that includes an operation of interfering between the measurement light reflected at the measurement point P of the semiconductor wafer W constituting the object to be measured and the reference light reflected by the reference light reflecting unit 130 have been described. However, the compensating method described in the above embodiment is applicable as long as a method calculates a temperature from an optical path length of the surface and the rear surface of the semiconductor wafer W. A modified example of the present embodiment, which does not use a reference light, will now be described.

Figure 14:
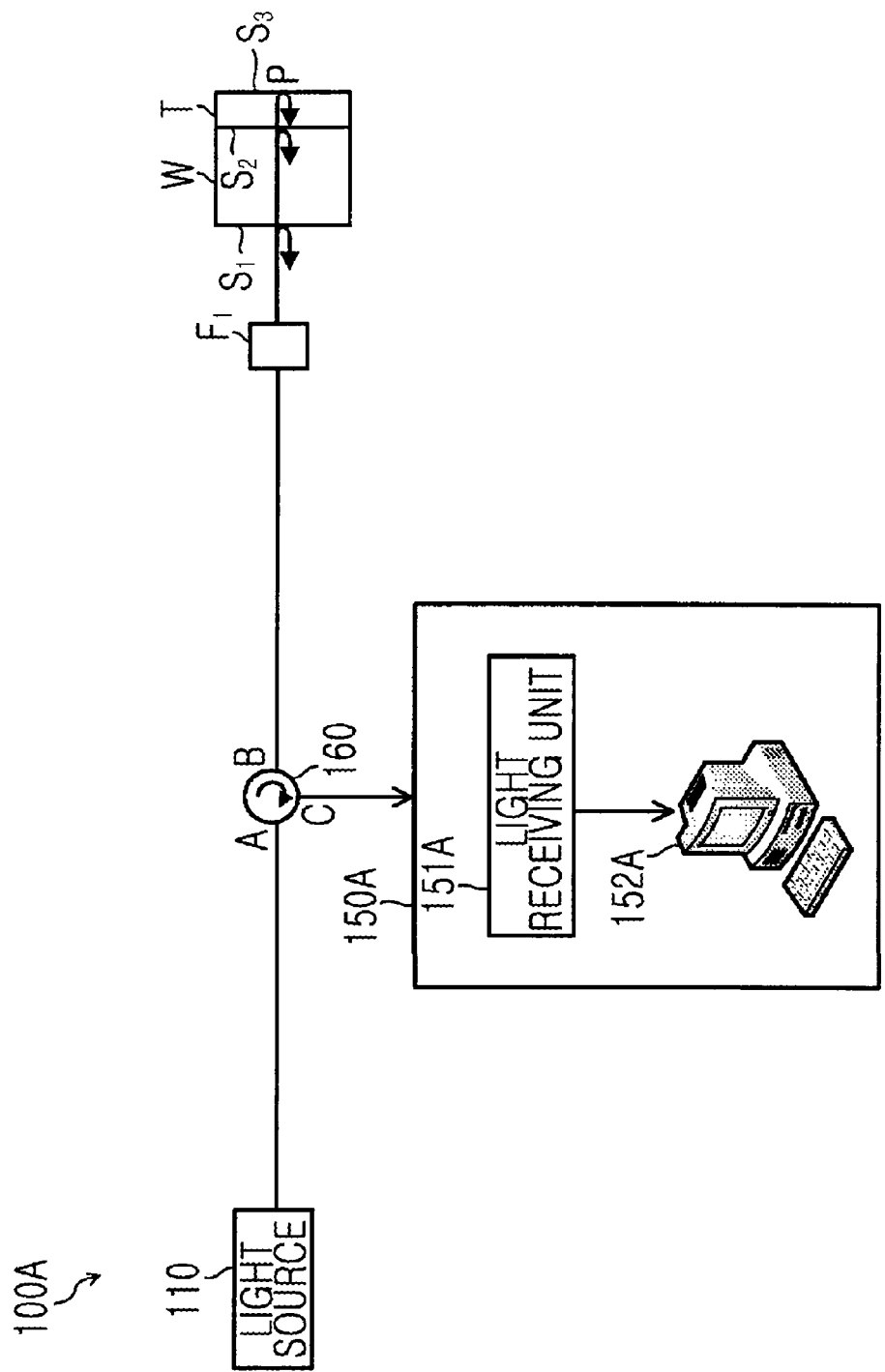
FIG. 14 is a diagram showing a configuration of a temperature measuring apparatus according to a modified example of the embodiment of FIG. 1.

FIG. 14 is a diagram showing a configuration of a temperature measuring apparatus 100A according to a modified example of the present embodiment. The temperature measuring apparatus 100A includes the light source 110, an optical circulator 160, the collimator fiber $F_1$ that transmits a measurement light to the measurement point P of the semiconductor wafer (substrate) W on which the thin film ($SiO_2$ film) T is formed, wherein the semiconductor wafer W is an object to be measured, and a signal processing apparatus 150A that measures a temperature of the measurement point P based on an interference waveform due to a reflected light of the measurement light. The signal processing apparatus 150A includes a light receiving unit 151A and a temperature calculating unit 152A. Hereinafter, each component of the temperature measuring apparatus 100A according to the modified example of the embodiment will be described with reference to FIG. 14, but a component substantially having the same functions as a component described in FIG. 1 will be denoted with the same reference numeral and details thereof will not be repeated.

The optical circulator 160 includes three ports A through C, wherein a light input to the port A is output from the port B, a light input from the port B is output from the port C, and a light input to the port C is output from the port A. In other words, the measurement light from the light source 110 input to the port A of the optical circulator 160 is emitted to the semiconductor wafer W from the port B of the optical circulator 160 through the collimator fiber $F_1$, and the reflected light input from the port B of the optical circulator 160 is input to the light receiving unit 151A from the port C of the optical circulator 160.

Figure 15:
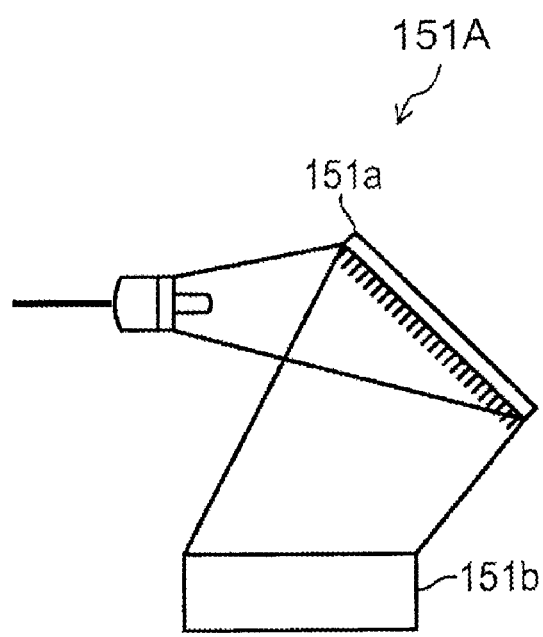
FIG. 15 is a diagram showing a configuration of a light receiving unit.

FIG. 15 is a diagram showing a configuration of the light receiving unit 151A. The light receiving unit 151A includes a diffraction grating 151a that wavelength-resolves the reflected light from the optical circulator 160, and a sensor 151b that converts the wavelength-resolved reflected light into an electric signal. The light receiving unit 151A generates and outputs a discrete signal obtained by separating the reflected light from the optical circulator 160 into a plurality of wavelengths. Also, the sensor 151b is a sensor using, for example, an Si photodiode, an InGaAs photodiode, or a Ge photodiode, but when the temperature of the semiconductor wafer W is measured, the sensor 151b may use an InGaAs photodiode.

Figure 16:
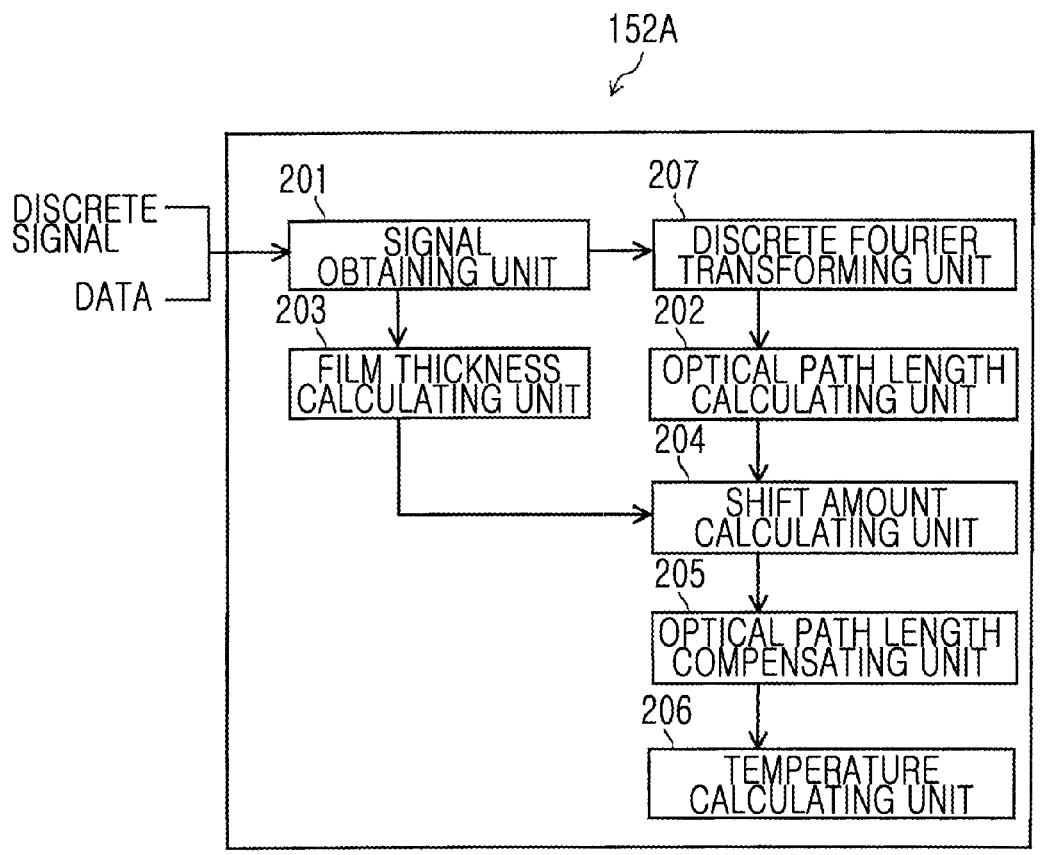
FIG. 16 is a functional diagram showing a configuration of a temperature calculating unit.

The temperature calculating unit 152A is, for example, a computer, and calculates the temperature of the semiconductor wafer W based on the discrete signal input from the light receiving unit 151A. FIG. 16 is a functional diagram showing a configuration of the temperature calculating unit 152A. The temperature calculating unit 152A includes the signal obtaining unit 201, the optical path length calculating unit 202, the film thickness calculating unit 203, the shift amount calculating unit 204, the optical path length compensating unit 205, the temperature calculating unit 206, and a discrete Fourier transforming unit 207.

Also, functions shown in FIG. 16 are realized by hardware (for example, an HDD, CPU, or memory) included in the temperature calculating unit 152A. In detail, the functions are realized as the CPU executes a program recorded in the HDD or memory.

The signal obtaining unit 201 obtains the discrete signal from the light receiving unit 151A. Also, the signal obtaining unit 201 obtains data required to calculate the temperature of the semiconductor wafer W, such as Equations 3 through 9 described in the above embodiment or various parameters, the film thickness of the thin film T, and the optical path length of the semiconductor wafer W at a predetermined temperature, from an upper level controller (for example, a host or IM apparatus connected to the temperature measuring apparatus 100A).

Figure 17:
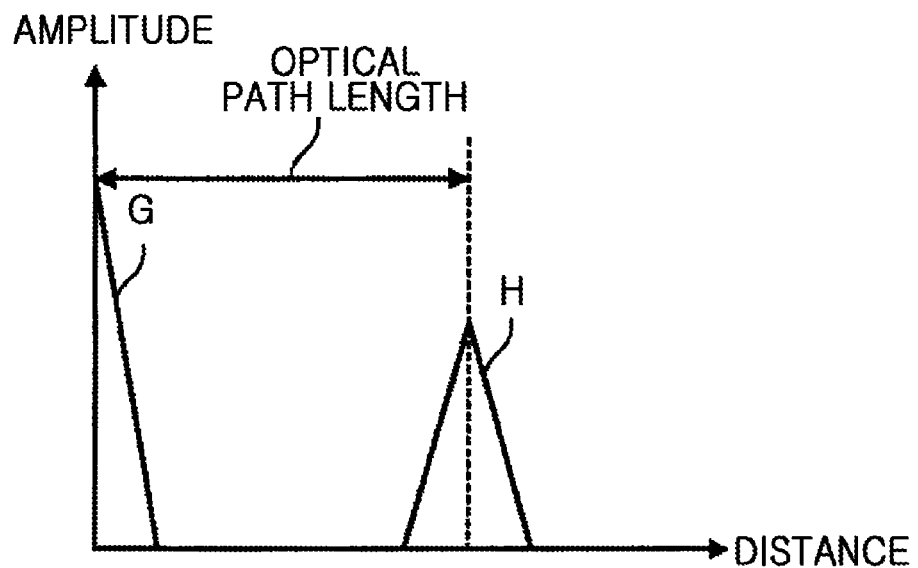
FIG. 17 is a graph showing a signal after discrete Fourier transformation (DFT)

The discrete Fourier transforming unit 207 performs a discrete Fourier transformation (DFT) process on the discrete signal obtained by the signal obtaining unit 201. The discrete signal from the light receiving unit 151A is converted into information about an amplitude and distance via the DFT process. FIG. 17 is a graph showing a signal after the DFT process. In FIG. 17, a vertical axis represents amplitude and a horizontal axis denotes a distance.

The optical path length calculating unit 202 calculates an optical path length based on the information about the amplitude and distance obtained via the DFT process. In detail, a distance between peaks of an interference wave G and interference wave H shown in FIG. 17 is calculated. The interference wave G and the interference wave H shown in FIG. 17 are respectively an interference wave at the surface $S_1$ of the semiconductor wafer W, and an interference wave where a plurality of interference waves multiple-reflected between the interface $S_2$ between the semiconductor wafer W and the thin film T, and the rear surface $S_3$ of the thin film T are overlapped.

The film thickness calculating unit 203 calculates the film thickness of the thin film T from the relationship (in detail, Equation 7) between the film thickness of the thin film T and the peak interference ratio, described with reference to FIG. 6.

The shift amount calculating unit 204 calculates the shift amount $\Delta L$ corresponding to the film thickness of the thin film T calculated by the film thickness calculating unit 203, based on the relationship between the film thickness of the thin film T and the shift amount $\Delta L$ of the interference wave F (in detail, Equation 7), described with reference to FIG. 9.

The optical path length compensating unit 205 calculates an actual optical path length by compensating for the optical path length calculated by the optical path length calculating unit 202 by using the shift amount $\Delta L$ calculated by the shift amount calculating unit 204.

Figure 18:
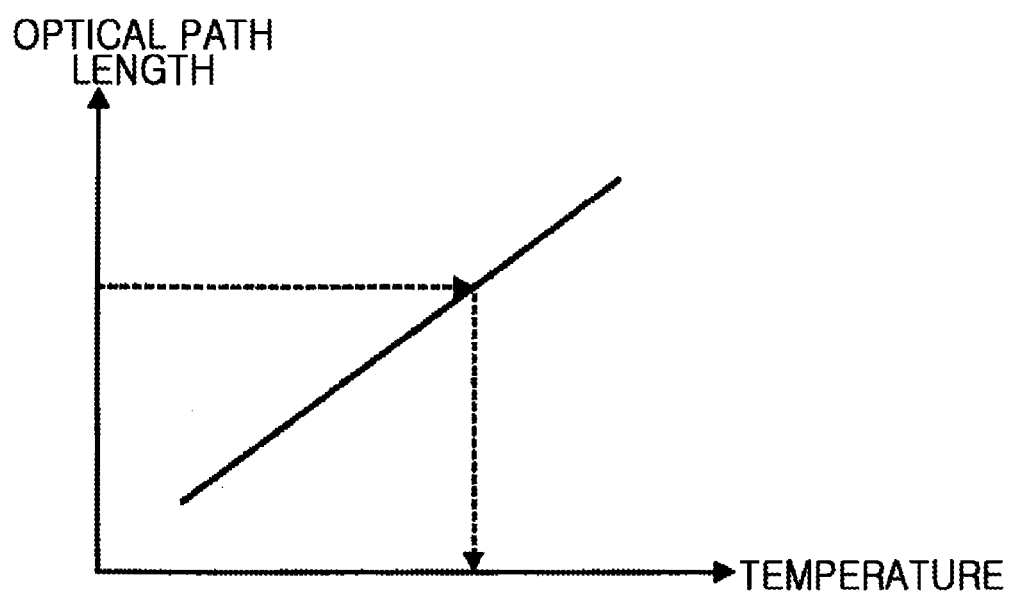
FIG. 18 is a graph showing a relationship between an optical path length and a temperature, after compensation.

The temperature calculating unit 206 calculates the temperature of the semiconductor wafer W constituting the object to be measured, based on the optical path length compensated for by the optical path length compensating unit 205. FIG. 18 is a graph showing a relationship between the optical path length and the temperature, after the compensation. The temperature calculating unit 206 calculates the temperature of the semiconductor wafer W based on the relationship between the optical path length and the temperature after the compensation shown in FIG. 18, and the optical path length after compensation calculated by the optical path length compensating unit 205.

Also, the relationship between the optical path length and the temperature shown in FIG. 18 may be measured via actual experiments or the like and pre-stored in an HDD, a memory, or the like included in the temperature calculating unit 152A, or may be obtained from the upper level controller described above.

As described above, since the temperature measuring apparatus 100A according to the modified example of the embodiment converts the reflected light from the semiconductor wafer W into the discrete signal by the light receiving unit 151A, and calculates the optical path length by performing the DFT process on the discrete signal, the reference light reflecting unit 130 does not have to be mechanically operated by the optical path length changing unit 140. Accordingly, the temperature of the semiconductor wafer W may be quickly measured. Other effects are identical to those of the temperature measuring apparatus 100 according to the embodiment.

Also, the present invention is not limited to the above embodiment and various changes in form and details may be made therein without departing from the scope of the present invention. For example, in the above embodiment, compensating for the optical path length when the thin film T formed on the semiconductor wafer W constituting the object to be measured is etched has been described, but the above embodiment may be also applied when a film is formed (deposited) on the semiconductor wafer W. In this case, a refractive index of the film to be deposited is pre-obtained, and a film thickness is calculated from the relationship between the film thickness of the thin film T and the interference intensity shown in FIG. 6. Also, unlike the case of etching, a direction of converting a film thickness is opposite, i.e., the film thickness is converted in a direction in which the film thickness increases.

According to the present invention, a temperature measuring method, a storage medium, and a program, which can accurately measure a temperature of an object to be measured even when a thin film is formed on the object, can be provided.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A temperature measuring method comprising:
    transmitting a light from a light source to a measurement point of an object to be measured, the object being a substrate on which a thin film is formed;
    measuring a first interference wave caused by a reflected light from a surface of the substrate, and a second interference wave caused by reflected lights from an interface between the substrate and the thin film and from a rear surface of the thin film;
    calculating an optical path length from the first interference wave to the second interference wave;
    calculating a film thickness of the thin film based on an intensity of the second interference wave;
    calculating an optical path difference between an optical path length of the substrate and the calculated optical path length, based on the calculated film thickness of the thin film;
    compensating for the optical path length from the first interference wave to the second interference wave based on the calculated optical path difference; and
    calculating a temperature of the object at the measurement point based on the compensated optical path length.

2. The temperature measuring method of claim 1, wherein the calculating of the film thickness comprises calculating the film thickness of the thin film based on a relationship between the film thickness of the thin film and the intensity of the second interference wave.

3. The temperature measuring method of claim 1, wherein the calculating of the film thickness comprises calculating the film thickness of the thin film based on a ratio of an intensity of the first interference wave to the intensity of the second interference wave.

4. The temperature measuring method of claim 1, wherein the light source generates a light having a wavelength equal to or more than 1000 nm, and the substrate is a silicon (Si) substrate.

5. The temperature measuring method of claim 1, wherein the thin film is any one of a silicon oxide ($SiO_2$) film, a silicon nitride ($Si_3N_4$) film, a resist film, a resin-based film, and a metal film.

6. A non-transitory computer-readable recording medium having recorded thereon a program for executing, in a computer, a temperature measuring method for measuring a temperature of an object to be measured at a measurement point based on an interference wave of a reflected light received by a light receiving unit, by using a temperature measuring apparatus comprising a light source, a transmitting unit which transmits a light from the light source to the measurement point of the object that is a substrate on which a thin film is formed, and the light receiving unit which receives the reflected light reflected from the object,
    wherein the program enables the computer to operate as:
    a measuring unit which measures a first interference wave caused by a reflected light which is reflected at surface of the substrate and received by the light receiving unit, and a second interference wave caused by reflected lights from an interface between the substrate and the thin film formed on the substrate and from a rear surface of the thin film;
    a first calculating unit which calculates an optical path length from the first interference wave to the second interference wave;
    a second calculating unit which calculates a film thickness of the thin film based on an intensity of the second interference wave;
    a third calculating unit which calculates an optical path difference between an optical path length of the substrate and the calculated optical path length, based on the calculated film thickness of the thin film;
    a compensating unit which compensates for the calculated optical path length from the first interference wave to the second interference wave based on the calculated optical path difference; and
    a fourth calculating unit which calculates a temperature of the object at the measurement point based on the compensated optical path length.

7. A computer executable program recorded in a non-transitory computer-readable recording medium for a computer to execute a temperature measuring method for measuring a temperature of an object to be measured at a measurement point based on an interference wave of a reflected light received by a light receiving unit, by using a temperature measuring apparatus comprising a light source, a transmitting unit which transmits a light from the light source to the measurement point of the object that is a substrate on which a thin film is formed, and the light receiving unit which receives the reflected light reflected from the object,
    the program enabling the computer to operate as:
    a measuring unit which measures a first interference wave caused by a reflected light which is reflected at a surface of the substrate and received by the light receiving unit, and a second interference wave caused by reflected lights from an interface between the substrate and the thin film formed on the substrate and from a rear surface of the thin film;
    a first calculating unit which calculates an optical path length from the first interference wave to the second interference wave;
    a second calculating unit which calculates a film thickness of the thin film based on an intensity of the second interference wave;
    a third calculating unit which calculates an optical path difference between an optical path length of the substrate and the calculated optical path length, based on the calculated film thickness of the thin film;
a compensating unit which compensates for the calculated optical path length from the first interference wave to the second interference wave based on the calculated optical path difference; and
a fourth calculating unit which calculates a temperature of the object at the measurement point based on the compensated optical path length.

* * * * *